US012600674B2

(12) United States Patent
Kano et al.

(10) Patent No.: US 12,600,674 B2
(45) Date of Patent: Apr. 14, 2026

(54) ALUMINA PARTICLES, RESIN COMPOSITION, MOLDED BODY, AND METHOD FOR PRODUCING ALUMINA PARTICLES

(71) Applicant: DIC Corporation, Tokyo (JP)

(72) Inventors: Yusuke Kano, Chiba (JP); Hironobu Oki, Chiba (JP); Jianjun Yuan, Chiba (JP)

(73) Assignee: DIC Corporation, Tokyo (JP)

( * ) Notice: Subject to any disclaimer, the term of this patent is extended or adjusted under 35 U.S.C. 154(b) by 846 days.

(21) Appl. No.: 17/893,207

(22) Filed: Aug. 23, 2022

(65) Prior Publication Data

US 2023/0082688 A1 Mar. 16, 2023

(30) Foreign Application Priority Data

Aug. 31, 2021 (JP) ................................. 2021-141271

(51) Int. Cl.
| | |
|---|---|
| *C04B 35/10* | (2006.01) |
| *C04B 35/626* | (2006.01) |
| *C08K 3/22* | (2006.01) |

(52) U.S. Cl.
CPC ........... *C04B 35/10* (2013.01); *C04B 35/626* (2013.01); *C08K 3/22* (2013.01); *C04B 2235/3217* (2013.01); *C04B 2235/404* (2013.01); *C04B 2235/42* (2013.01); *C04B 2235/5292* (2013.01); *C04B 2235/786* (2013.01); *C08K 2003/2227* (2013.01)

(58) Field of Classification Search
CPC .................. C04B 35/10; C04B 35/626; C04B 2235/5292; C08K 2003/2227; C08K 7/00; C01G 39/00; C01P 2004/20; C01P 2004/54
See application file for complete search history.

(56) References Cited

U.S. PATENT DOCUMENTS 4,568,449 A * 2/1986 Angmorter ............ C10G 45/08
208/216 PP

FOREIGN PATENT DOCUMENTS

| | | | |
|---|---|---|---|
| CN | 108560052 | 9/2018 | |
| JP | 2016222501 | 12/2016 | |
| WO | WO-2019194159 A1 * | 10/2019 | .............. H05K 7/20 |
| WO | WO-2019194160 A1 * | 10/2019 | ........... C08L 101/00 |

OTHER PUBLICATIONS

WO-2019194160-A1 machine translation (Year: 2019).*
WO-2019194159-A1 machine translation (Year: 2019).*

* cited by examiner

*Primary Examiner* — Cameron K Miller
(74) *Attorney, Agent, or Firm* — JCIPRNET

(57) ABSTRACT
Provided are alumina particles containing molybdenum and with their shape controlled. The alumina particles contain phosphorus and molybdenum. The alumina particles are preferably plate-like or card house-like. The phosphorus is preferably unevenly distributed in surface layers of the alumina particles. Also provided are a resin composition containing the alumina particles and a resin, a molded body made by molding the resin composition, and a method for producing the alumina particle including a step of firing the aluminum compound in the presence of a molybdenum compound and a phosphorous compound.

20 Claims, 5 Drawing Sheets

ALUMINA PARTICLES, RESIN COMPOSITION, MOLDED BODY, AND METHOD FOR PRODUCING ALUMINA PARTICLES

CROSS-REFERENCE TO RELATED APPLICATION

This application claims the priority benefits of Japanese application No. 2021-141271, filed on Aug. 31, 2021. The entirety of the above-mentioned patent application is hereby incorporated by reference herein and made a part of this specification.

BACKGROUND OF THE INVENTION

1. Field of the Invention

The present invention relates to alumina particles containing phosphorus and molybdenum and a resin composition and a molded body containing the alumina particles. It also relates to a method for producing the alumina particles containing phosphorus and molybdenum.

2. Description of the Related Art

Alumina is a chemically stable compound, is hence difficult to react with molecules on the skin surface and is hypoallergenic, and is thus being widely used in applications such as cosmetics and biomaterials. It is also difficult to react with external pollutants and is also employed in the applications of paints, coatings, and optical materials.

In these applications, it is preferable to contain alumina α-crystals, which are highly chemically and physically stable. As a luminous pigment in particular, a shape with a high aspect ratio is demanded rather than the typically known icosahedron because the area of a face that can efficiently reflect light is large.

The common and the lowest priced conventional method for producing α-alumina is the Bayer process using bauxite as a raw material. In the Bayer process, aluminum hydroxide (gibbsite) or transition alumina is produced from the raw material bauxite, and then these are fired in the air to produce α-alumina powder. However, the α-alumina obtained by the Bayer process is an aggregate of amorphous particles, and it is difficult to control its particle shape by the process.

By the way, it is disclosed that by using a molybdenum compound as a flux agent and using silicon or a silicon compound as a shape control agent, plate-like alumina particles containing molybdenum and alumina α-crystals can be produced (Japanese Patent Application Laid-open No. 2016-222501).

However, there is still room to study shape control agents other than silicon or the silicon compound that enables shape control of alumina particles in the flux method using the molybdenum compound as the flux agent.

The present invention has been made in order to solve the problem and an object thereof is to provide alumina particles containing molybdenum and with their shape controlled.

Another object of the present invention is to provide a method for producing the alumina particles.

SUMMARY OF THE INVENTION

The inventors of the present invention have conducted earnest studies to solve the subjects to find out that by using phosphorus as a shape control agent in the flux method using a molybdenum compound as a flux agent, alumina particles with their shape controlled to be plate-like or card house-like, which is a shape with a high aspect ratio, can be obtained and to complete the present invention.

Specifically, the present invention has the following aspects.

(1) Alumina particles containing phosphorus and molybdenum.

(2) The alumina particles according to (1) above, in which the alumina particles have an α-crystallinity of 90% by weight or more.

(3) The alumina particles according to (1) or (2) above, in which the alumina particles are plate-like.

(4) The alumina particles according to (3) above, in which the alumina particles have a $D_{50}$ of 2 to 100 μm.

(5) The alumina particles according to (3) above, in which an average particle size of primary particles of the alumina particles is 5 to 200 μm and an aspect ratio obtained by dividing the average particle size of the primary particles of the alumina particles by a thickness of the primary particles of the alumina particles is 2 to 100.

(6) The alumina particles according to (1) or (2) above, in which the alumina particles are card house-like.

(7) The alumina particles according to (6) above, in which the alumina particles have a $D_{50}$ of 3 to 300 μm.

(8) The alumina particles according to (6) above, in which the alumina particles contain plate-like alumina with an average particle size of 5 to 200 μm, and an aspect ratio obtained by dividing an average particle size by a thickness of each plate-like alumina is 2 to 100.

(9) The alumina particles according to any one of (1) to (8) above, in which the alumina particles have an isoelectric point of 0~3 that is a pH with zeta potential of 0.

(10) The alumina particles according to any one of (1) to (9), in which the alumina particles have a specific surface area measured by the BET method of 0.1 to 10 $m^2/g$.

(11) The alumina particles according to any one of (1) to (10) above, in which the molybdenum is unevenly distributed in surface layers of the alumina particles.

(12) The alumina particles according to any one of (1) to (11) above, in which the phosphorus is unevenly distributed in surface layers of the alumina particles.

(13) The alumina particles according to any one of (1) to (12) above, in which the alumina particles have a molar ratio [P]/[Al] between a phosphorus concentration and an aluminum concentration by X-ray photoelectron spectroscopy (XPS) measurement of 0.001 or more.

(14) A resin composition containing the alumina particles according to any one of (1) to (13) above and a resin.

(15) A molded body made by molding the resin composition according to (14) above.

(16) A method for producing the alumina particles according to any one of (1) to (13) above, the method including firing an aluminum compound in the presence of a molybdenum compound and a phosphorus compound.

(17) The method for producing the alumina particles according to (16) above, including firing a mixture of the molybdenum compound, the phosphorus compound, and the aluminum compound.

(18) The method for producing the alumina particles according to (16) above, including firing a mixture of a molybdenum-containing aluminum compound and the phosphorus compound.

(19) The method for producing the alumina particles according to (16) above, including firing a mixture of a phosphorus-containing aluminum compound and the molybdenum compound.

(20) The method for producing the alumina particles according to (16) above, including firing a mixture of a phosphorus-containing molybdenum compound and the aluminum compound.

(21) The method for producing the alumina particles according to any one of (16) to (20) above, in which a firing temperature is 900 to 1,600° C.

DETAILED DESCRIPTION OF EMBODIMENTS

Figure 1:
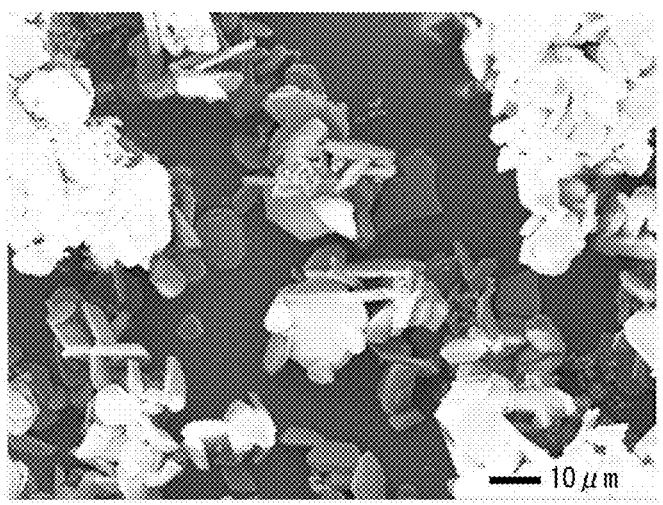
FIG. 1 is a scanning electron microscope (SEM) image of alumina particles of Example 1.
Figure 2:
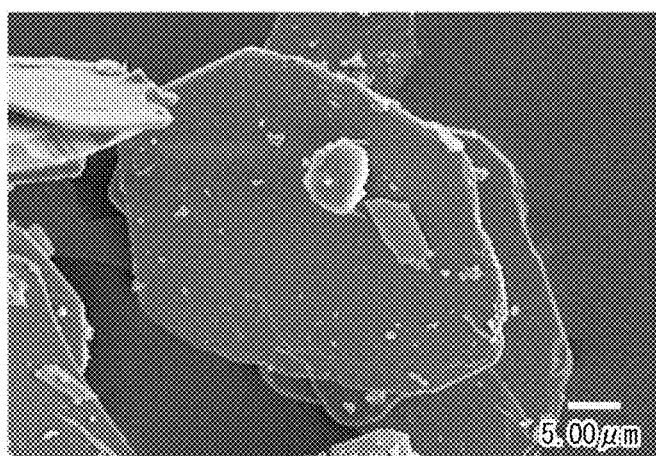
FIG. 2 is a SEM image of alumina particles of Example 2.
Figure 3:
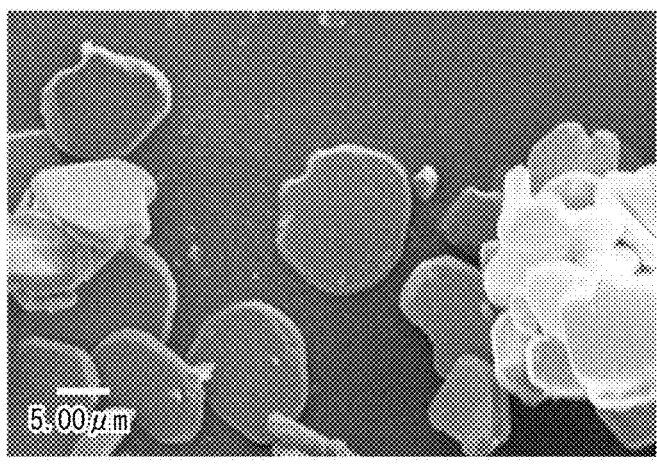
FIG. 3 is a SEM image of alumina particles of Example 3.
Figure 4:
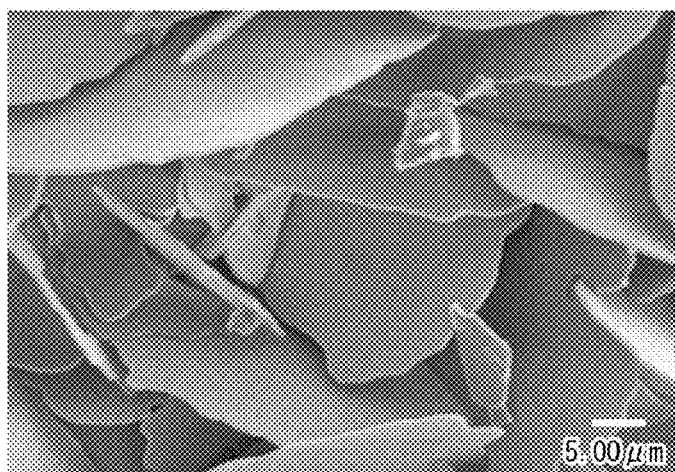
FIG. 4 is a SEM image of alumina particles of Example 4.
Figure 5:
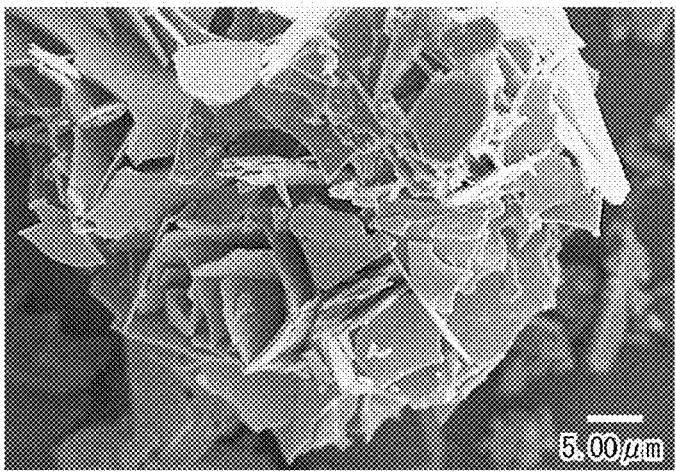
FIG. 5 is a SEM image of alumina particles of Example 5.
Figure 6:
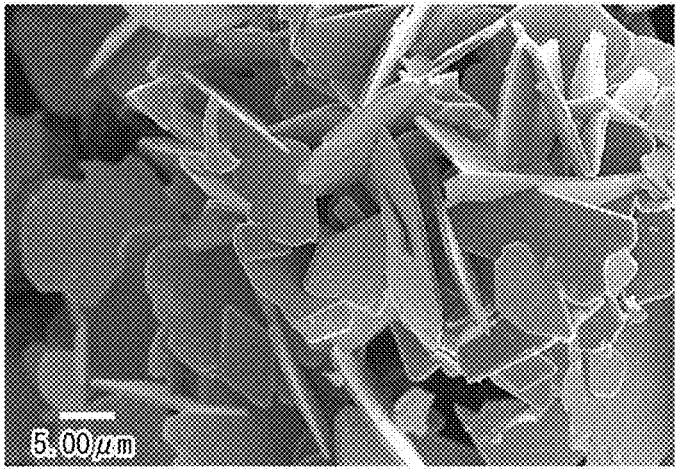
FIG. 6 is a SEM image of alumina particles of Example 6.
Figure 7:
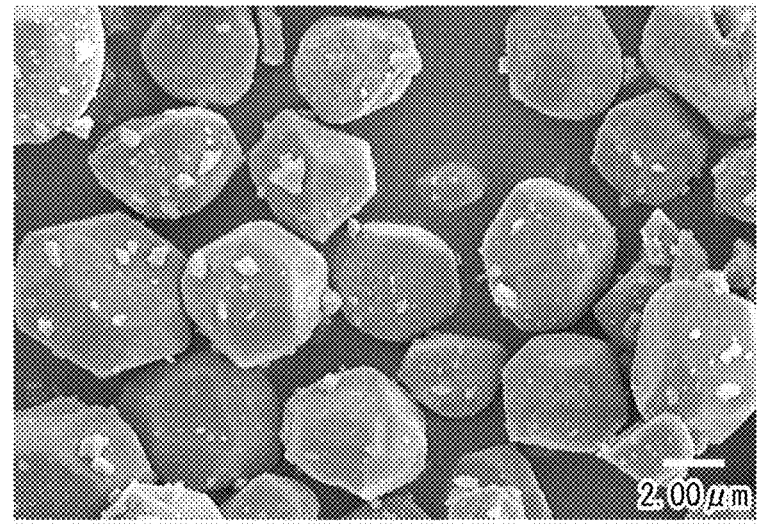
FIG. 7 is a SEM image of alumina particles of Comparative Example 1.
Figure 8:
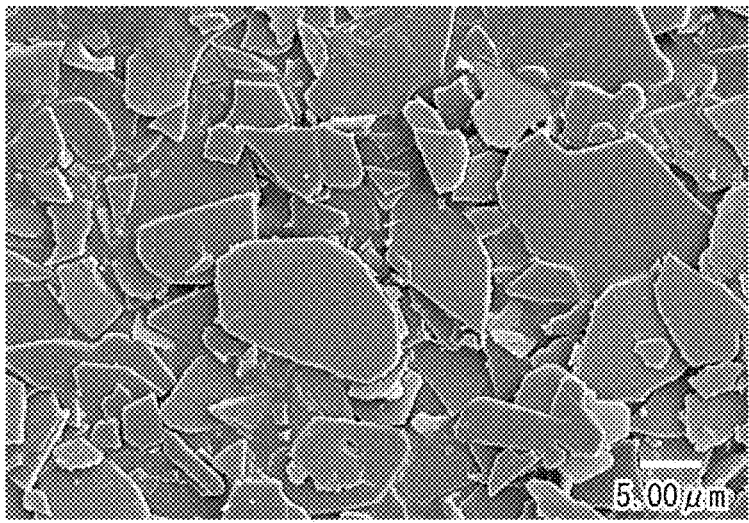
FIG. 8 is a SEM image of alumina particles of Comparative Example 2.

The present invention can provide alumina particles with their shape controlled and containing phosphorus and molybdenum.

The following describes embodiments of alumina particles and a method for producing the alumina particles of the present invention.

Alumina Particles

The alumina particles of the embodiment contain phosphorus and molybdenum. The alumina particles of the embodiment contain molybdenum and have excellent properties such as catalytic activity derived from molybdenum.

The alumina particles of the embodiment can contain molybdenum derived from a molybdenum compound for use in the method of production described below.

The alumina particles of the embodiment further contain phosphorus. The alumina particles can contain phosphorus or phosphorus derived from a phosphorus compound used as a shape control agent in the method of production described below. The shape control agent plays an important role in plate-like crystal growth.

Alumina

In the present specification, "alumina" is aluminum oxide ($Al_2O_3$). The alumina particles of the embodiment are not limited in crystal form to a particular form so long as they contain phosphorus and molybdenum and may be transition alumina of various crystal forms such as $\gamma$, $\delta$, $\theta$, and $\kappa$ or contain alumina hydrate in transition alumina, for example. They are preferably basically the $\alpha$-crystalline form in that it has better mechanical strength or thermal conductivity.

The $\alpha$-crystallinity of the alumina particles can be determined by X-ray diffraction (XRD) analysis. Using a wide-angle X-ray diffraction (XRD) apparatus (Ultima IV manufactured by Rigaku Corporation, for example), a produced sample is set in a holder for a sample to be measured, measurement is performed under the conditions of Cu/K$\alpha$ radiation, 40 kV/40 mA, a scan speed of 2°/min, and a scanning range of 10 to 70°, and the $\alpha$-crystallinity can be determined by the reference intensity ratio (RIR) method from a peak intensity ratio between $\alpha$-alumina and other alumina species with respect to the baseline, for example. The $\alpha$-crystallinity varies depending on firing conditions and raw materials used, and from the viewpoint of improving the crushing strength and the fluidity of the alumina particles, the $\alpha$-crystallinity is preferably 90% by weight or more and more preferably 95% by weight or more.

The alumina particles having the $\alpha$-crystallinity are preferred because they have a dense $\alpha$-crystalline structure and thus have high strength and are hard to break even with a plate shape or a card house shape, which is a high respect ratio.

Molybdenum

The alumina particles of the embodiment contain molybdenum. The alumina particles may contain molybdenum in the surface layers thereof. Using the properties of molybdenum contained in the alumina particles, the alumina particles can be used for applications such as oxidation reaction catalysts and optical materials.

Molybdenum contained by the alumina particles of the embodiment, which is not limited to a particular molybdenum, may be molybdenum oxide, a partially reduced molybdenum compound, a molybdate, or the like apart from metallic molybdenum. Molybdenum may be included in plate-like alumina particles in any of the possible polymorphs or a combination of molybdenum compounds and may be contained in the plate-like alumina particles as $\alpha$-$MoO_3$, $\beta$-$MoO_3$, $MoO_2$, $MoO$, a molybdenum cluster structure, or the like.

The contained form of molybdenum is not limited to a particular form. It may be contained in the form of adhering to the surfaces of the plate-like alumina particles, be contained in the form of substituting part of aluminum in the crystal structure of alumina, or be a combination of these.

Phosphorus

The alumina particles of the embodiment contain phosphorus. The alumina particles may contain phosphorus in the surface layers thereof.

The alumina particles may contain as phosphorus or a phosphorus compound at least one selected from the group consisting of simple phosphorus (P), phosphorus oxide ($P_4O_{10}$ and $P_2O_5$), aluminum phosphate ($AlPO_4$), aluminum dihydrogen phosphate ($Al(H_2PO_4)_2$), aluminum dihydrogen triphosphate ($AlH_2(P_3O_{10})$), phosphomolybdic acid ($H_3(MoO_3)_{12}PO_4$), and the like; organophosphorous compounds such as trialkyl phosphines, triaryl phosphines, phosphine oxides, phosphinates, phosphonates, phosphates, and phosphoranes; phosphates such as organic amine phosphates; compounds such as phosphoric acid, organic phosphoric acid, and polyphosphoric acid derivatives; and their oxides, hydrates, and the like, for example, which vary depending on raw materials used, and may contain the substances in the surface layers thereof.

The alumina particles of the embodiment may contain aluminum phosphate ($AlPO_4$) and may contain aluminum phosphate ($AlPO_4$) in the surface layers thereof.

The "phosphorus or the phosphorus compound" contained by the alumina particles according to the embodiment and a "raw material phosphorus compound" used as the shape control agent as the raw material may be the same type of phosphorus compound.

Containing phosphorus in the alumina particle surfaces can make the surface properties of the alumina particles more acidic than a case without it and can improve an affinity for basic organic compounds and various binders and matrices, for example. The alumina particles of the embodiment can be suitably used as a resin composition containing the alumina particles and a resin, for example. It is possible to improve an affinity between basic dispersants including organic amine compounds that may be blended in the resin composition and an acidic phosphorus part of the alumina particle surfaces, for example. The surface condition of the alumina surfaces can be easily controlled by phosphorus atoms and/or the phosphorus compound on the alumina particle surfaces.

The alumina particles of the embodiment are alumina particles with their shape controlled. In the present specification, the alumina particles with their shape controlled mean alumina particles that are not amorphous in particle shape.

The alumina particles of one embodiment produced by the method of production of the embodiment can have a plate-like or card house-like peculiar idiomorphic shape as shown in examples described below.

Plate-Like Alumina Particles

The alumina particles of the embodiment may have a plate-like shape.

The median diameter $D_{50}$ of the plate-like alumina particles of the embodiment calculated by laser diffraction and scattering is preferably 2 to 100 μm, more preferably 5 to 40 μm, and even more preferably 10 to 20 μm.

The median diameter $D_{50}$ of the plate-like alumina particles of the embodiment is calculated by laser diffraction and scattering. Specifically, the median diameter $D_{50}$ can be determined by measuring particle size distribution in dry form with an aggregate (powder) of alumina particles used as a sample using a laser diffraction particle size analyzer (HELOS (H3355) & RODOS, R3: 0.5/0.9-175 μm, manufactured by Japan Laser Corporation, for example) under the conditions of a dispersion pressure of 3 bar and a drawing pressure of 90 mbar.

The average particle size of primary particles of the plate-like alumina particles of the embodiment may be 5 to 200 μm, 5 to 50 μm, or 10 to 40 μm.

As to the average particle size of the primary particles of the plate-like alumina particles, the plate-like alumina particles are photographed with a scanning electron microscope (SEM), and for particles as the smallest unit forming an aggregate on a two-dimensional image (that is, the primary particles), the average of the measured maximum length among distances between two points on the contour line of 50 randomly selected primary particles is employed.

The thickness of the primary particles of the plate-like alumina particles of the embodiment may be less than 5 μm, 0.1 to 4 μm, 0.3 to 3 μm, or 0.5 to 2 μm.

As to the thickness of the primary particles of the plate-like alumina particles, the alumina particles are photographed with a scanning electron microscope (SEM), and for particles as the smallest unit forming an aggregate on a two-dimensional image (that is, the primary particles), the average of the measured thickness of 50 randomly selected primary particles is employed.

In the present specification, "plate-like" refers to an aspect ratio obtained by dividing the average particle size of the primary particles of the alumina particles by the thickness of the primary particles of the alumina particles being 2 or more. The aspect ratio of the primary particles of the plate-like alumina particles is preferably 2 to 100, more preferably 5 to 50, and even more preferably 6 to 30.

The aspect ratio being the lower limit value or more is preferred because heat dissipation ability and the like caused by a large specific surface area is well exhibited. The aspect ratio being the upper limit value or less is preferred because of having excellent mechanical strength.

The respective values of the average particle size and the aspect ratio of the plate-like alumina particles exemplified above can be freely combined with each other. Examples of the plate-like alumina particles of the embodiment include plate-like alumina particles having an average particle size of the primary particles of 5 to 200 μm and having an aspect ratio obtained by dividing the average particle size of the primary particles of the alumina particles by the thickness of the primary particles of the alumina particles of 2 to 100.

Examples of the specific shape of the plate-like alumina particles include a hexahedral plate shape in three dimensions, in which the shape of a two-dimensional projected face is a typical quadrilateral with four corners (a square plate shape) or the shape of a two-dimensional projected face is a polygonal shape with five or more corners (hereinafter the latter may be referred to as polygonal plate-like). The specific shape of the plate-like alumina particles may be circular plate-like or an oval plate-like.

The aggregate (powder) of the alumina particles may contain alumina particles of any shape other than plate-like in any state. The content proportion of the plate-like alumina particles is preferably 80% or more, more preferably 90% or more, and even more preferably 95% or more on a weight basis or a number basis with respect to the total amount of the aggregate (powder) of the alumina particles.

Card House-Like Alumina Particles

The alumina particles of the embodiment may have a card house structure in which a plurality of pieces of plate-like alumina adhere to each other. Specifically, the alumina particles of the embodiment may have a card house structure formed by three or more pieces of plate-like alumina in which the pieces of plate-shape alumina adhere to each other (refer to FIG. 10, for example). The alumina particles having the card house structure can have a larger specific surface area than that of spherical alumina particles of the same particle size. In the present specification, the alumina particles having a card house structure may be referred to as card house-like alumina particles.

Figure 11:
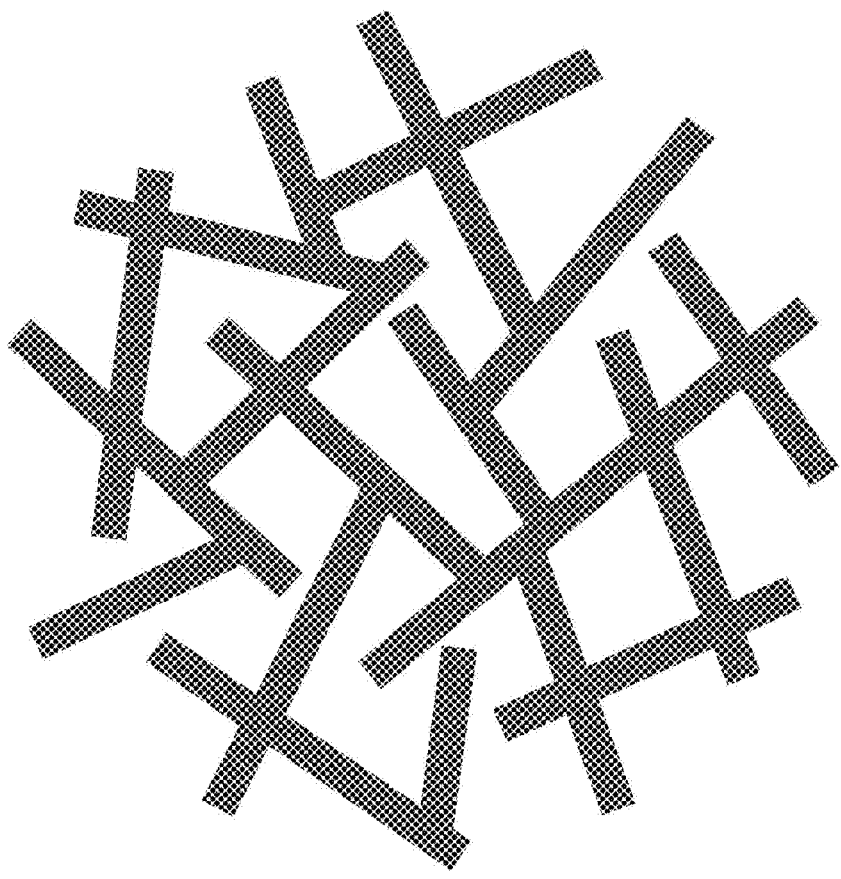
FIG. 11 is a schematic diagram of another example of the configuration of the alumina particles having a card house structure.

The morphology of the alumina particles can be determined with a scanning electron microscope (SEM). The card house structure may be a structure in which pieces of plate-like alumina are not oriented in a specific direction but are arranged in a disorderly manner, for example. The card house structure may be a state in which three or more pieces of plate-like alumina cross each other at two or more multiple locations to assemble, and the face directions of the pieces of plate-like alumina crossing each other are arranged in a disorderly manner, for example (refer to FIG. 11). The crossing position may be any position of the plate-like alumina. Being arranged in a disorderly manner refers to that there are no limitations on a direction in which faces cross each other in all X-axial, Y-axial, and Z-axial directions, and the angle at which faces cross each other may be any angle.

The number of pieces of plate-like alumina contained in one card house-like alumina particle, which varies depending on the particle size of the alumina particles, is preferably, for example, 3 to 10,000, among them 10 to 5,000, and in particular 15 to 3,000 in view of both performance and ease of production.

The crossing of pieces of plate-like alumina appears by three or more pieces of plate-like alumina adhering together and assembling through some interaction, for example, by adhering in the process of crystal formation by a firing step. The crossing may appear to be a penetrating type as a consequence. The pieces of plate-like alumina strongly adhere to each other, thereby increasing the strength of the card house structure.

The crossing represents that two or more faces cross each other at a single point, and there are no limitations on the position, the diameter, the area or the like on which the faces cross each other. The number of directions of the faces starting from the point of the crossing may be three directions or four or more directions.

The long diameter, the short diameter, and the thickness of the faces of the plate-like alumina itself contained in the card house-like alumina particles may be of any size. The card house-like alumina particles may contain pieces of plate-like alumina of a plurality of sizes.

As described above about the plate-like alumina particles, the plate-like alumina may be square plate-like alumina or polygonal plate-like alumina. Within a single card house-like alumina particle, only one of the square plate-like alumina and the polygonal plate-like alumina may be present or both may be present, with no limitations on the ratio between the two.

Apart from the card house structure, the aggregate (powder) of the alumina particles may contain substantially X-shaped, with two pieces of plate-like alumina crossing each other, (may be called twinned alumina particles), substantially T-shaped, or substantially L-shaped particles or one piece of plate-like alumina in any state. To obtain excellent fluidity, a smaller content proportion of these is preferred. The content proportion of the alumina particles formed by three or more pieces of plate-like alumina and having a card house structure in which the pieces of plate-like alumina adhere to each other is preferably 80% or more, more preferably 90% or more, and even more preferably 95 or more on a weight basis or a number basis with respect to the total amount of the aggregate (powder) of the alumina particles. The content proportion of the twinned and one piece of plate-like alumina can be easily adjusted by general classification operations such as sieve classification and wind power classification.

Due to their unique structure, the alumina particles having a card house structure have very high crushing strength and do not easily crush even when external stress is applied. This makes it hard to cause faulty fluidity based on the anisotropy of the alumina particles themselves. Consequently, the function that the alumina particles originally have can be fully drawn out, and even if they are used in combination with the plate-like alumina particles, the plate-like alumina particles, which tend to be oriented in the longitudinal direction, can be caused to be present in a random direction. Consequently, excellent mechanical strength can be exhibited not only in the longitudinal direction but also in the thickness direction.

Based on their unique structure, the card house-like alumina particles have excellent fluidity as powder and can increase the discharge efficiency of feeding machines for use in machine conveyance, such as hoppers and feeders, for being applied as industrial products. The card house-like alumina particles have voids inside due to their unique structure, and thus their bulk density is not significantly different from that of the plate-like alumina particles, but they have a higher sphericity and, as described above, have higher crushing strength and are less likely to be broken than the plate-like alumina particles, and it is thus assumed that they have a high effect on the ease of conveyance by the rolling of the alumina particles.

The median diameter $D_{50}$ of the card house-like alumina particles of the embodiment calculated by laser diffraction and scattering is preferably 3 to 300 μm, more preferably 5 to 100 μm, and even more preferably 5 to 40 μm.

The median diameter $D_{50}$ of the card house-like alumina particles of the embodiment is calculated by laser diffraction and scattering in the same manner as for the plate-like alumina particles.

The maximum particle size of the card house-like alumina particles measured by laser diffraction and scattering, which is not limited to a particular size, is usually 3,000 μm or less, preferably 1,000 μm or less, and more preferably 500 μm or less.

The card house-like alumina particles of the embodiment may contain plate-like alumina with an average particle size of 5 to 200 μm, contain plate-like alumina with an average particle size of 5 to 50 μm, or contain plate-like alumina with an average particle size of 5 to 20 μm.

The card house-like alumina particles of the embodiment may contain plate-like alumina with a thickness of 0.1 to 5 μm, contain plate-like alumina with a thickness of 0.2 to 2 μm, or contain plate-like alumina with a thickness of 0.3 to 1 μm.

The aspect ratio obtained by dividing the average particle size by the thickness of the plate-like alumina is preferably 2 to 100, more preferably 5 to 50, and even more preferably 10 to 40.

The aspect ratio being the lower limit value or more is preferred because heat dissipation ability and the like caused by a large specific surface area is well exhibited. The aspect ratio being the upper limit value or less is preferred because of having excellent mechanical strength.

The respective values of the average particle size and the aspect ratio of the plate-like alumina exemplified above can be freely combined with each other. Examples of the card house-like alumina particles of the embodiment include card house-like alumina particles containing the plate-like alumina with an average particle size of 5 to 200 μm and having an aspect ratio obtained by dividing the average particle size by the thickness of each plate-like alumina of 2 to 100.

The values of the average particle size and the thickness of the plate-like alumina forming the card house-like alumina particles mean values measured and calculated from an image obtained with a scanning electron microscope (SEM) for any 100 plate-like alumina particles.

The method for determining the average particle size of the plate-like alumina is observing the card house-like alumina particles with a SEM and determining the maximum length among distances between two points on the contour line for the plate-like alumina positioned at the center of at least 50 randomly selected card house-like alumina particles on a two-dimensional image, for example. The average thereof is defined as the average particle size of the plate-like alumina of the card house-like alumina particles. Alternatively, if a result similar to the above is obtained, a method of measuring the maximum length of a single piece obtained by performing a wind power classification operation on the card house-like alumina particles with a SEM may be used. Alternatively, a method of decomposing the card house structure by some mechanical treatment under conditions that do not destroy the plate-like alumina itself to obtain a single piece and measuring the maximum length with a SEM may be used.

For the method for determining the thickness of the plate-like alumina, similarly, a method of observing the card house-like alumina particles with a SEM, measuring the maximum thickness of the plate-like alumina positioned at the center of at least 50 randomly selected card house-like alumina particles on a two-dimensional image, and calculating the average thereof is used, for example. Alternatively, if a result similar to the above is obtained, a method of measuring the thickness of a single piece obtained by performing a wind power classification operation on the card house-like alumina particles with a SEM may be used. Alternatively, a method of decomposing the card house structure by some mechanical treatment under conditions that do not destroy the plate-like alumina itself to obtain a single piece and measuring the thickness with a SEM may be used.

The alumina particles of the embodiment can contain $\alpha$-alumina ($\alpha$-$Al_2O_3$).

An $\alpha$-$Al_2O_3$ content ($R_A$) contained in the alumina particles is determined by XRD analysis. The alumina particles of the embodiment have an $\alpha$-$Al_2O_3$ content ($R_A$) with respect to 100% by weight of the alumina particles determined from spectral data obtained by performing the XRD analysis on the alumina particles by the reference intensity ratio (RIR) method of preferably 70.0 to 99.9% by weight, more preferably 75.0 to 99.7% by weight, and even more preferably 80.0 to 99.5% by weight.

The alumina particles of the embodiment can contain aluminum phosphate ($AlPO_4$).

An $AlPO_4$ content ($R_B$) contained in the alumina particles is determined by XRD analysis. The alumina particles of the embodiment have an $AlPO_4$ content ($R_B$) with respect to 100% by weight of the alumina particles determined from spectral data obtained by performing the XRD analysis on the alumina particles by the reference intensity ratio (RIR) method of preferably 0.01 to 30.0% by weight, more preferably 0.05 to 25.0% by weight, and even more preferably 0.1 to 20.0% by weight.

The alumina particles of the embodiment contain aluminum.

An aluminum content contained in the alumina particles can be measured by X-ray fluorescence (XRF) analysis. The alumina particles of the embodiment have an $Al_2O_3$ content ($A_1$) with respect to 100% by mass of the alumina particles determined by performing the XRF analysis on the alumina particles of preferably 70.0 to 99.5% by mass, more preferably 85.0 to 99.5% by mass, and even more preferably 89.0 to 99.0% by mass.

The alumina particles of the embodiment contain molybdenum. The alumina particles of the embodiment have a $MoO_3$ content ($M_1$) with respect to 100% by mass of the alumina particles determined by performing the XRF analysis on the alumina particles of preferably 0.01 to 20.0% by mass, more preferably 0.05 to 5.0% by mass, and even more preferably 0.1 to 3.0% by mass.

The respective upper limit values and the respective lower limit values of the $Al_2O_3$ content ($A_1$) and the $MoO_3$ content ($M_1$) exemplified above in the alumina particles of the embodiment can be freely combined with each other. The respective values of the $Al_2O_3$ content ($A_1$) and the $MoO_3$ content ($M_1$) can also be freely combined with each other.

Examples of the alumina particles of the embodiment include alumina particles with an $Al_2O_3$ content ($A_1$) of 70.0 to 99.5% by mass and a $MoO_3$ content ($M_1$) of 0.01 to 20.0% by mass.

The alumina particles of the embodiment contain phosphorus. The phosphorus content of the alumina particles of the embodiment has a $P_2O_4$ content ($P_1$) with respect to 100% by mass of the alumina particles determined by performing the XRF analysis on the alumina particles of preferably 0.01 to 15% by mass, more preferably 0.1 to 10% by mass, and even more preferably 0.5 to 6% by mass.

The respective upper limit values and the respective lower limit values of the $Al_2O_3$ content ($A_1$), the $MoO_3$ content ($M_1$), and the $P_2O_4$ content ($P_1$) exemplified above in the alumina particles of the embodiment can be freely combined with each other. The respective values of the $Al_2O_3$ content ($A_1$), the $MoO_3$ content ($M_1$), and the $P_2O_4$ content ($P_1$) can also be freely combined with each other.

Examples of the alumina particles of the embodiment include alumina particles with an $Al_2O_3$ content ($A_1$) of 70.0 to 99.5% by mass, a $MoO_3$ content ($M_1$) of 0.01 to 20.0% by mass, and a $P_2O_4$ content ($P_1$) of 0.01 to 15% by mass.

The $Al_2O_3$ content ($A_1$), the $MoO_3$ content ($M_1$), and the $P_2O_4$ content ($P_1$) can be measured by performing the XRF analysis using an X-ray fluorescence analyzer (Primus IV manufactured by Rigaku Corporation, for example).

The $Al_2O_3$ content ($A_1$) refers to a value obtained by performing the X-ray fluorescence (XRF) analysis on the alumina particles and determining an Al content as an $Al_2O_3$ content with respect to 100% by mass of the alumina particles from a calibration curve for $Al_2O_3$ determined in advance.

The $MoO_3$ content ($M_1$) refers to a value obtained by performing the X-ray fluorescence (XRF) analysis on the alumina particles and determining a Mo content as a $MoO_3$ content with respect to 100% by mass of the alumina particles from a calibration curve for $MoO_3$ determined in advance.

The $P_2O_4$ content ($P_1$) refers to a value obtained by performing the X-ray fluorescence (XRF) analysis on the alumina particles and determining a P content as a $P_2O_4$ content with respect to 100% by mass of the alumina particles from a calibration curve for $P_2O_4$ determined in advance.

An aluminum content contained in the surface layers of the alumina particles can be measured by X-ray photoelectron spectroscopy (XPS) surface analysis. The alumina particles of the embodiment have an $Al_2O_3$ content ($A_2$) with respect to 100% by mass of the surface layers of the alumina particles determined by performing XPS surface analysis on the alumina particles of preferably 50 to 95% by mass, more preferably 55 to 90% by mass, and even more preferably 70 to 90% by mass.

The alumina particles of the embodiment have a $MoO_3$ content ($M_2$) with respect to 100% by mass of the surface layers of the alumina particles determined by performing XPS surface analysis on the alumina particles of preferably 0.1 to 20% by mass, more preferably 0.5 to 10% by mass, and even more preferably 1 to 7% by mass.

The respective upper limit values and the respective lower limit values of the $Al_2O_3$ content ($A_2$) and the $MoO_3$ content ($M_2$) exemplified above in the alumina particles of the embodiment can be freely combined with each other. The respective values of the $Al_2O_3$ content ($A_2$) and the $MoO_3$ content ($M_2$) can also be freely combined with each other.

Examples of the alumina particles of the embodiment include alumina particles with an $Al_2O_3$ content ($A_2$) of 50 to 95% by mass and a $MoO_3$ content ($M_2$) of 0.1 to 20% by mass.

The alumina particles of the embodiment may contain phosphorus in the surface layers thereof. The alumina particles of the embodiment have a $P_2O_4$ content ($P_2$) with respect to 100% by mass of the surface layers of the alumina particles determined by performing the XPS surface analysis on the alumina particles of preferably 0.1 to 40% by mass, more preferably 1 to 30% by mass, and even more preferably 5 to 20% by mass.

The respective upper limit values and the respective lower limit values of the $Al_2O_3$ content ($A_2$), the $MoO_3$ content ($M_2$), and the $P_2O_4$ content ($P_2$) exemplified above in the alumina particles of the embodiment can be freely combined with each other. The respective values of the $Al_2O_3$ content ($A_2$), the $MoO_3$ content ($M_2$), and the $P_2O_4$ content ($P_2$) can also be freely combined with each other.

Examples of the alumina particles of the embodiment include alumina particles with an $Al_2O_3$ content ($A_2$) of 50 to 95% by mass, a $MoO_3$ content ($M_2$) of 0.1 to 20% by mass, and a $P_2O_4$ content ($P_2$) of 0.1 to 40% by mass.

The $Al_2O_3$ content ($A_2$) refers to a value determined as the content of $Al_2O_3$ with respect to 100% by mass of the surface layers of the alumina particles by performing the XPS surface analysis on an alumina particle sample by X-ray photoelectron spectroscopy (XPS) to acquire presence proportions (atom %) for respective elements and determining an aluminum content in terms of oxide.

The $MoO_3$ content ($M_2$) refers to a value determined as the content of $MoO_3$ with respect to 100% by mass of the surface layers of the alumina particles by performing the XPS surface analysis on an alumina particle sample by X-ray photoelectron spectroscopy to acquire presence proportions (atom %) for respective elements and determining a molybdenum content in terms of oxide.

The $P_2O_4$ content ($P_2$) refers to a value determined as the content of $P_2O_4$ with respect to 100% by mass of the surface layers of the alumina particles by performing the XPS surface analysis on an alumina particle sample by X-ray photoelectron spectroscopy to acquire presence proportions (atom %) for respective elements and determining a phosphorus content in terms of oxide.

The XPS surface analysis can be measured by X-ray photoelectron spectroscopy (XPS) using a scanning X-ray photoelectron spectral analyzer (QUANTERA SXM manufactured by ULVAC Phi, Inc., for example) using mono-chromatized Al-Kα as an X-ray source.

In the present specification, when the analysis of the alumina particles is performed using the X-ray photoelectron spectroscopy (XPS) apparatus, a sample can be press-fixed onto a double-sided tape and be subjected to composition analysis under the following conditions.

X-ray source: monochromatized Al-Kα, beam diameter 100 μmφ, output 25 W
    Measurement: area measurement (1,000 μm square), n=3
    Charging correction: C1s=284.8 eV In the alumina particles of the embodiment, the molybdenum is preferably unevenly distributed in the surface layers of the alumina particles.

In the alumina particles of the embodiment, the phosphorus is preferably unevenly distributed in the surface layers of the alumina particles.

The "surface layers" in the present specification refer to within 10 nm of the surfaces of the alumina particles of the embodiment. This distance corresponds to XPS detection depth used for measurement in the examples.

Molybdenum being "unevenly distributed in the surface layers" refers to a state in which the mass of molybdenum or the molybdenum compound per unit volume in the surface layers is larger than the mass of molybdenum or the molybdenum compound per unit volume in other than the surface layers.

The fact that molybdenum is unevenly distributed in the surface layers of the alumina particles in the alumina particles of the present embodiment can be determined by the fact that the $MoO_3$ content ($M_2$) with respect to 100% by mass of the surface layers of the alumina particles determined by performing the XPS surface analysis on the alumina particles is larger than the $MoO_3$ content ($M_1$) with respect to 100% by mass of the alumina particles determined by performing the X-ray fluorescence (XRF) analysis on the alumina particles as shown in the examples described below.

In the alumina particles of the embodiment, as an indicator of molybdenum being unevenly distributed in the surface layers of the alumina particles, the alumina particles of the embodiment have a surface layer unevenly distributed ratio ($M_2/M_1$) of the $MoO_3$ content ($M_2$) to the $MoO_3$ content ($M_1$) of preferably larger than 1 and 20 or less, more preferably 1.05 to 17, and even more preferably 1.5 to 5.

By unevenly distributing molybdenum or the molybdenum compound in the surface layers, excellent properties such as catalytic activity can be imparted more efficiently than a case in which molybdenum or the molybdenum compound is caused to be uniformly present not only in the surface layers but also in other than the surface layers (inner layers).

Phosphorus being "unevenly distributed in the surface layers" refers to a state in which the mass of phosphorus or the phosphorus compound per unit volume in the surface layers is larger than the mass of phosphorus or the phosphorus compound per unit volume in other than the surface layers.

The fact that phosphorus is unevenly distributed in the surface layers of the alumina particles in the alumina particles of the present embodiment can be determined by the fact that the $P_2O_5$ content ($P_2$) with respect to 100% by mass of the surface layers of the alumina particles determined by performing the XPS surface analysis on the alumina particles is larger than the $P_2O_5$ content ($P_1$) with respect to 100% by mass of the alumina particles determined by performing the X-ray fluorescence (XRF) analysis on the alumina particles as shown in the examples described below.

In the alumina particles of the embodiment, as an indicator of phosphorus being unevenly distributed in the surface layers of the alumina particles, the alumina particles of the embodiment have a surface layer unevenly distributed ratio ($P_2/P_1$) of the $P_2O_5$ content ($P_2$) to the $P_2O_5$ content ($P_1$) of preferably larger than 1 and 20 or less, more preferably 1.1 to 17, and even more preferably 1.5 to 15.

By unevenly distributing phosphorus or the phosphorus compound in the surface layers, excellent properties such as improvement in dispersibility to resins containing basic functional groups, for example, can be imparted more efficiently than a case in which phosphorus or the phosphorus compound is caused to be uniformly present not only in the surface layers but also in other than the surface layers (the inner layers).

In addition to molybdenum and the phosphorus listed above, the alumina particles of the embodiment may further contain lithium, potassium, or sodium.

In addition to the phosphorus listed above, the alumina particles of the embodiment may further contain silicon, which is known to be usable as the shape control agent. However, because of the capability of favorable shape control of the alumina particles even without using silicon, the alumina particles of the embodiment do not necessarily substantially contain silicon.

The alumina particles of the embodiment may contain phosphorus in the surface layers. The value of the molar ratio of P to Al [P]/[Al] measured by the XPS analysis is preferably 0.001 or more, more preferably 0.01 or more, even more preferably 0.02 or more, and particularly preferably 0.1 or more.

The upper limit of the value of the molar ratio [P]/[Al] of the XPS analysis, which is not limited to a particular value, may be 0.5 or less, 0.4 or less, or 0.3 or less.

The alumina particles have a value of the molar ratio of P to Al [P]/[Al] acquired in the XPS analysis of preferably 0.001 or more and 0.9 or less, more preferably 0.01 or more and 0.8 or less, and even more preferably 0.02 or more and 0.7 or less. The molar ratio of P to Al acquired by the XPS analysis being within the above range is preferred because the surfaces in particular become more strongly acidic, resulting in a lower isoelectric point of a zeta potential and suitable dispersibility exhibited when mixed with compounds having basic functional groups, for example.

The alumina particles of the embodiment contain molybdenum and phosphorus and thus have the isoelectric point of the zeta potential shifted to the acidic side compared to alumina particles that do not contain them, thus resulting in excellent dispersibility. Using the properties of molybdenum contained in the alumina particles, they can be used for the applications of oxidation reaction catalysts and optical materials.

The pH of the isoelectric point at which the zeta potential of the alumina particles of the embodiment is 0 (zero) is preferably in a range of 0 to 3, for example, and more preferably in a range of 0 to 2.

The specific surface area of the alumina particles of the embodiment determined by the BET method may be 0.1 to 10 $m^2/g$, 0.1 to 2 $m^2/g$, or 0.3 to 1 $m^2/g$.

The alumina particles of the embodiment, with their shape controlled, can be suitably used for various applications.

The alumina particles of the embodiment can contain α-alumina crystals and have a plate-like shape or a card house-like shape with a high aspect ratio. Such alumina particles can be suitably used as thermally conductive fillers, high-brightness pigments, paints for vehicle exterior, cosmetics, abrasives, conductive powder base materials, and lubricants for resin films due to their features including a large specific surface area and high brightness.

Resin Composition

The alumina particles of the embodiment can be blended with a resin to be used as a resin composition. As an embodiment, a resin composition containing the alumina particles of the embodiment and a resin is provided.

The resin, which is not limited to a particular resin, may be a polymer, an oligomer, or a monomer and may be a thermosetting resin or a thermoplastic resin.

Thermosetting Resin

The thermosetting resin is a resin having the property of being capable of changing to be substantially insoluble and infusible when cured by heating or means of radiation, catalysts, or the like. For example, it can be a known and customary resin used for molding materials or the like. Specific examples thereof include novolac type phenolic resins such as phenol novolac resins and cresol novolac resins; phenolic resins such as unmodified resol phenolic resins and resol type phenolic resins such as oil-modified resol phenolic resins modified with paulownia oil, linseed oil, walnut oil, or the like; bisphenol type epoxy resins such as bisphenol A epoxy resins and bisphenol F epoxy resins; novolac type epoxy resins such as fatty chain-modified bisphenol type epoxy resins, novolac epoxy resins, and cresol novolac epoxy resins; epoxy resins such as biphenyl type epoxy resins and polyalkylene glycol type epoxy resins; urea resins; resins having triazine rings such as melamine resins; vinyl resins such as (meth)acrylic resins and vinyl ester resins; unsaturated polyester resins, bismaleimide resins, polyurethane resins, diallyl phthalate resins, silicone resins, resins having benzoxazine rings, and cyanate ester resins, which may be polymers, oligomers, or monomers.

The thermosetting resin described above may be used together with a curing agent. The curing agent used in this process can be used in known and customary combination with the thermosetting resin. When the thermosetting resin is an epoxy resin, for example, any compounds in common use as a curing agent can be used. Examples thereof include amine-based compounds, amide-based compounds, acid anhydride-based compounds, and phenolic compounds. Specific examples of the amine-based compounds include diaminodiphenylmethane, diethylenetriamine, triethylenetetramine, diaminodiphenyl sulfone, isophoronediamine, imidazole, $BF_3$-amine complexes, and guanidine derivatives. Examples of the amide-based compounds include dicyandiamide and polyamide resins synthesized from a dimer of linolenic acid and ethylenediamine. Examples of the acid anhydride-based compounds include phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride, and methylhexahydrophthalic anhydride. Examples of the phenolic compounds include phenol novolac resins, cresol novolac resins, aromatic hydrocarbon formaldehyde resin-modified phenolic resins, dicyclopentadiene phenol-additive resins, phenol aralkyl resins (Zylock resin), polyvalent phenol novolac resins synthesized from a polyvalent hydroxy compound and formaldehyde represented by resorcinol novolac resins, naphthol aralkyl resins, trimethylolmethane resins, tetraphenylolethane resins, naphthol novolac resins, naphthol-phenol co-condensed novolac resins, naphthol-cresol co-condensed novolac resins, biphenyl-modified phenolic resins (polyvalent phenolic compounds with phenolic nuclei linked by bismethylene groups), biphenyl-modified naphthol resins (polyvalent naphthol compounds with phenolic nuclei linked by bismethylene groups), aminotriazine-modified phenolic resins (polyvalent phenolic compounds with phenolic nuclei linked by melamine, benzoguanamine, or the like), and polyvalent phenol compounds such as alkoxy group-containing aromatic ring-modified novolac resins (polyvalent phenolic compounds with phenolic nuclei and alkoxy group-containing aromatic rings linked by formaldehyde). These curing agents can be used alone or in combination of two or more.

The blending amounts of the thermosetting resin and the curing agent in the resin composition of the embodiment are not limited to particular amounts. When the curable resin is an epoxy resin, for example, in view of good cured product properties to be obtained, they are preferably used in amounts giving 0.7 to 1.5 equivalents of active groups in the curing agent with respect to a total of 1 equivalent of epoxy groups in the epoxy resin.

As needed, a curing accelerator can be combined with the thermosetting resin in the resin composition of the embodiment as appropriate. When the curable resin is an epoxy resin, for example, various curing accelerators can be used. Examples thereof include phosphorus-based compounds, tertiary amines, imidazole, organic acid metal salts, Lewis acids, and amine complex salts.

As needed, a curing catalyst can also be used in combination with the thermosetting resin in a timely manner. Examples thereof include known and customary thermal polymerization initiators and active energy ray polymerization initiators.

Thermoplastic Resin

Examples of the thermoplastic resin that may be used for the resin composition of the embodiment include known and customary resins used for molding materials or the like. Specific examples thereof include polyethylene resins, polypropylene resins, polymethyl methacrylate resins, polyvinyl acetate resins, ethylene-propylene copolymers, ethylene-vinyl acetate copolymers, polyvinyl chloride resins, polystyrene resins, polyacrylonitrile resins, polyamide resins, polycarbonate resins, polyacetal resins, polyethylene terephthalate resins, polyphenylene oxide resins, polyphenylene sulfide resins, polysulfone resins, polyethersulfone resins, polyetheretherketone resins, polyarylsulfone resins, thermoplastic polyimide resins, thermoplastic urethane resins, polyamino bismaleimide resins, polyamideimide resins, polyetherimide resins, bismaleimide-triazine resins, polymethylpentene resins, fluorinated resins, liquid crystal polymers, olefin-vinyl alcohol copolymers, ionomer resins, polyarylate resins, acrylonitrile-ethylene-styrene copolymers, acrylonitrile-butadiene-styrene copolymers, and acrylonitrile-styrene copolymers. While at least one thermoplastic resin can be selected for use, a combination of two or more thermoplastic resins can also be used depending on the purpose.

The resin composition of the embodiment may also contain other compounds as needed, and external lubricants, internal lubricants, antioxidants, fire retardants, light stabilizers, UV absorbers, silane-based, titanate-based, and aluminate-based coupling agents, reinforcing materials such as glass fibers and carbon fibers, fillers, various coloring agents, and the like may also be added to the extent that the effects of the invention can be obtained. In addition, stress reducing agents (stress relieving agents) such as silicone oils, liquid rubbers, rubber powders, butadiene-based copolymer rubbers such as methyl acrylate-butadiene-styrene copolymers and methyl methacrylate-butadiene-styrene copolymers, and silicone-based compounds can also be used.

The resin composition of the embodiment is obtained by mixing together the alumina particles of the embodiment, the resin, and, in addition, other compounds as needed. The method of mixing is not limited to a particular method, and they are mixed together by any known and customary methods.

A general method when the resin is a thermosetting resin includes sufficiently mixing together the thermosetting resin, the alumina particles of the embodiment, and other components as needed with a mixer or the like and then kneading them together with a three-roll or the like to obtain a liquid composition with fluidity or sufficiently mixing together certain blending amounts of the thermosetting resin, the alumina particles of the embodiment, and other components as needed with a mixer or the like, then melt kneading them with a mixing roll, an extruder, or the like, and then cooling them to obtain a solid composition. Their mixed state, when a curing agent, a catalyst, and the like are blended, preferably allows the curable resin and those compounds to be sufficiently uniformly mixed together and more preferably also allows the alumina particles of the embodiment to be uniformly dispersed and mixed.

Examples of a general method when the resin is a thermoplastic resin include a method of mixing together the thermoplastic resin, the alumina particles of the embodiment, and other components as needed in advance using various kinds of mixers such as a tumbler and a Henschel mixer and then melt kneading them with a mixer such as a Banbury mixer, a roll, a Brabender mixer, a uniaxial kneading extruder, a biaxial kneading extruder, a kneader, or a mixing roll. The temperature of the melt kneading is not limited to a particular temperature. Examples thereof include in a range of 240 to 320° C.

The mixing ratio between the alumina particles of the embodiment and a nonvolatile content of the resin in preparing the resin composition of the embodiment is not limited to a particular ratio. It is preferable to select from a range of 0.1 to 900 parts of the alumina particles per 100 parts of the nonvolatile content of the resin in terms of mass.

Molded Body

The resin composition of the embodiment can be molded to obtain a molded body. As an embodiment, a molded body made by molding the resin composition of the embodiment is provided. To obtain a resin molded body, known and customary methods can be used.

When the resin contained in the resin composition is a thermosetting resin, for example, it is sufficient to comply with a method for curing a thermosetting resin composition such as general epoxy resin compositions. The resin composition in which the resin is an epoxy resin or the like, for example, can be cured by heat, and the heating temperature condition in that process may be selected as appropriate depending on the type of a curing agent to be combined, applications, and the like, and heating may be performed in a temperature range of about room temperature to 250° C. In the case of active energy ray curable resins, they can be cured and molded by being irradiated with active energy rays such as ultraviolet rays and infrared rays.

When the resin of the embodiment is a thermoplastic resin, it can also be made into the molded body by known and customary methods of molding. Examples thereof include injection molding, ultrahigh-speed injection molding, injection compression molding, two-color molding, gas-assisted and other hollow molding, molding using insulated molds, molding using rapidly heated molds, foam molding (including supercritical fluids), insert molding, in-mold coating molding (IMC molding), extrusion molding, sheet molding, rotational molding, laminate molding, and press molding. A method of molding using a hot runner system can also be used. There are no limitations on the shape, pattern, color, dimensions, and the like of the molded body, which may be set as desired in accordance with the application of the molded body.

Method for Producing Alumina Particles

Firing Step

The alumina particles of the embodiment contain phosphorus and molybdenum. Examples of a method for producing the alumina particles of the embodiment include firing an aluminum-containing compound in the presence of molybdenum and phosphorus.

As an embodiment, a method for producing the alumina particles including a step of firing an aluminum compound in the presence of a molybdenum compound and a phosphorous compound is exemplified. Specifically, the alumina particles of the embodiment can be produced by a method including any of the following steps, for example.

1) A step of firing a mixture of the molybdenum compound, the phosphorous compound, and the aluminum compound 2) A step of firing a mixture of a molybdenum-containing aluminum compound and the phosphorus compound 3) A step of firing a mixture of a phosphorus-containing aluminum compound and the molybdenum compound 4) A step of firing a mixture of a phosphorus-containing molybdenum compound and the aluminum compound In these examples, all of 2) the case using the molybdenum-containing aluminum compound and the phosphorus compound, 3) the case using the phosphorus-containing aluminum compound and the molybdenum compound, and 4) the case using the phosphorus-containing molybdenum compound and the aluminum compound are regarded as firing the aluminum compound in the presence of the molybdenum compound and the phosphorus compound.

The state of the compounds during firing is not limited to a particular state, and they are only required to be present in the same space. Specifically, the mixture may be obtained by simple mixing of powders, mechanical mixing using a pulverizer or the like, or mixing using a mortar or the like and mixing in a dry state or a wet state.

In any of the methods 1) to 4), the alumina particles of the embodiment containing phosphorus and molybdenum can be obtained by firing each mixture of the compounds.

Through firing, aluminum atoms react with molybdenum atoms to form aluminum molybdate. This is called the flux method, and a molybdenum-containing compound is called a flux agent.

The flux method is classified as the solution method. The flux method, more specifically, is a method of crystal growth using the fact that a crystal-flux two-component state diagram shows a eutectic type one. The mechanism of the flux method is presumed to be as follows. That is to say, when a mixture of a solute and a flux is heated, the solute and the flux become a liquid phase. In this process, the flux is a melting agent, or in other words, a solute-flux two-component state diagram shows a eutectic type one, and thus the solute melts at a temperature lower than its melting point to form a liquid phase. When the flux is evaporated in this state, the concentration of the flux decreases, or in other words, the effect of lowering the melting point of the solute by the flux reduces, and the evaporation of the flux acting as driving force causes the crystal growth of the solute (the flux evaporation method). Causing crystal growth in a liquid phase flux agent is also a preferred method, and the solute and the flux can cause the crystal growth of the solute also by cooling the liquid phase (the slow cooling method).

The flux method has advantages such as the ability to grow crystals at temperatures much lower than the melting point, the ability to precisely control a crystal structure, and the ability to form polyhedral crystal bodies having their idiomorphic shape.

In the production of alumina particles by the flux method using the molybdenum compound as the flux, although mechanism is not necessarily clear, it is presumed to be due to the following mechanism, for example. That is to say, when the aluminum compound is fired in the presence of the molybdenum compound, aluminum molybdate is first formed. In this process, the aluminum molybdate grows alumina crystals at a lower temperature than the melting point of alumina as can be understood from the above explanation. Then, the crystal growth is accelerated through the decomposition of aluminum molybdate, the evaporation of the flux, and the like to obtain the alumina particles, for example. That is to say, the molybdenum compound functions as a flux, and the alumina particles are produced via an intermediate, or aluminum molybdate.

Phosphorus or the phosphorus compound plays an important role in plate-like crystal growth as the shape control agent. In a commonly performed molybdenum oxide flux method, molybdenum oxide reacts with an aluminum compound to form aluminum molybdate, and then a change in chemical potential in a process in which this aluminum molybdate decomposes is driving force for crystallization, and thus hexagonal bipyramidal polyhedral particles with the idiomorphic plane (113) developed are formed. It is considered that in the method of production of the embodiment, phosphorus or the phosphorus compound is localized near the particle surfaces in the α-alumina growth process, which significantly inhibits the growth of the idiomorphic plane (113), resulting in relatively faster growth of the crystal orientation in the face direction, and the (006) plane grows, which can form a plate-like form.

The above mechanism is only by way of speculation, and even if the effect of the present invention is obtained by a mechanism different from the above mechanism, it is included in the technical scope of the present invention.

The flux method is a reaction with a firing temperature of preferably 700° C. or more, in which aluminum atoms and molybdenum atoms react with each other to form aluminum molybdate. Furthermore, the firing temperature being 900° C. or more is preferred because aluminum molybdate decomposes, the plate shape is facilitated to be formed with high efficiency by the action of phosphorus, and thus the plate-like or card house-like particles are facilitated to be produced.

In place of using the molybdenum compound as the flux agent for the aluminum compound, an equivalent effect can be obtained by directly using molybdenum-containing aluminum and firing it at 700° C. or more.

Furthermore, as the firing temperature is increased, alumina particles experience crystal growth in the presence of molybdenum, and thus the proportion of α-alumina crystals markedly increases. The firing temperature being 900° C. or more is preferred because the α-crystallinity of the alumina particles is 90% by weight or more.

Generally, when the shape of α-alumina crystals obtained after firing is attempted to be controlled, high-temperature firing at 2,000° C. or more, which is close to the melting point of α-alumina, is required to be performed. However, there are significant challenges to industrial use in terms of a burden on a firing furnace, limitations on heat-resistant materials for the furnace, and fuel costs.

Although the method of production of the embodiment can be carried out even at a temperature as high as exceeding 2,000° C., the presence of molybdenum atoms enables the formation of the plate-like or card house-like α-alumina particles with a high α-crystallinity and a high aspect ratio regardless of the shape of a precursor, even at a temperature of 1,600° C. or less, which is considerably lower than the melting point of α-alumina.

According to one embodiment of the present invention, the formation of the alumina particles with a high aspect ratio and an α-crystallinity of 90% by weight or more can be performed efficiently at low cost even under the condition of a firing temperature of 900 to 1,600° C.; firing at a firing temperature of 950 to 1,500° C. is preferred, and firing at a firing temperature of 1,000 to 1,400 is more preferred.

As to the firing time, it is preferable to perform a temperature rising time to a certain firing temperature in a range of 15 minutes to 10 hours and to set a holding time at the firing temperature to 5 minutes or more, and it is more preferable to perform holding in a range of 5 minutes to 100 hours. To efficiently perform the formation of the alumina particles, the firing holding time is more preferably a time of about 10 minutes to 15 hours.

By selecting the conditions of a firing temperature of 900 to 1,600° C. and a firing holding time of 10 minutes to 15 hours, the alumina particles with an α-crystallinity of 90% by weight or more can be easily obtained.

By selecting the conditions of a firing temperature of 1,000 to 1,400° C. and a firing holding time of 10 minutes to 15 hours, the alumina particles with a higher crystallinity can be easily obtained.

The atmosphere of firing is preferably an oxygen-containing atmosphere such as air or oxygen or an inert atmosphere such as nitrogen, argon, or carbon dioxide, for example, and is more preferably an air atmosphere, considering the aspect of cost.

The apparatus for firing is not necessarily limited, and what is called a firing furnace can be used. The firing furnace is preferably formed of a material that does not react with sublimated molybdenum oxide, and furthermore, it is preferable to use a highly sealed firing furnace so that molybdenum oxide can be efficiently used.

In obtaining the alumina particles, they can be obtained by firing the aluminum-containing compound in the presence of molybdenum and phosphorus.

Furthermore, firing in the presence of potassium is preferred because the plate-like or card house-like alumina particles can be obtained more stably.

Molybdenum Compound

The molybdenum compound, which can be used as the raw material, functions as a flux agent in the α-crystal growth of alumina. The molybdenum compound is not limited to a particular compound. Examples thereof include molybdenum oxide and compounds containing acid root anions ($MoO_x{}^{n-}$) containing bonding between metallic molybdenum and oxygen.

The compounds containing the acid root anion ($MoO_x{}^{n-}$) are not limited to a particular compound. Examples thereof include molybdic acid, sodium molybdate, potassium molybdate, lithium molybdate, $H_3PMo_{12}O_{40}$, $H_3SiMo_{12}O_{40}$, $NH_4Mo_7O_{12}$, and molybdenum disulfide.

Among the molybdenum compounds described above, molybdenum oxide is preferably used from the viewpoint of cost. The molybdenum compounds described above may be used alone or used in combination of two or more.

The molybdenum-containing aluminum compound and the phosphorus-containing molybdenum compound described below contain molybdenum and can thus also be used as the molybdenum compound.

The use amount of the molybdenum compound is not limited to a particular amount. The molar ratio of the molybdenum element to 1 mole of the aluminum element (Mo/Al) in the entire raw material compound (the above mixture to be fired, for example) is preferably 0.005 to 10, more preferably 0.007 to 5, and even more preferably 0.01 to 3.

When the molybdenum compound is used as the flux agent when the flux method is employed, the alumina particles contain molybdenum, and this can be used as evidence to identify by what method of production unknown alumina particles have been produced.

Phosphorus Compound

Examples of phosphorus or the phosphorus compound that can be used as the raw material include at least one selected from the group consisting of simple phosphorus (P), phosphorus oxide ($P_4O_{10}$ and $P_2O_5$), aluminum phosphate ($AlPO_4$), aluminum dihydrogen phosphate ($Al(H_2PO_4)_3$), aluminum dihydrogen triphosphate ($AlH_2(P_3O_{10})$), phosphomolybdic acid ($H_3(MoO_3)_{12}PO_4$), and the like; organophosphorous compounds such as trialkyl phosphines, triaryl phosphines, phosphine oxides, phosphinates, phosphonates, phosphates, and phosphoranes; phosphates such as organic amine phosphates; compounds such as phosphoric acid, organic phosphoric acid, and polyphosphoric acid derivatives; and their oxides, hydrates, and the like.

Among them, preferred are phosphorus oxide ($P_4O_{10}$ and $P_2O_5$), aluminum phosphate ($AlPO_4$), aluminum dihydrogen phosphate ($Al(H_2PO_4)_3$), and phosphomolybdic acid hydrate.

Phosphorus or the phosphorus compound can be used as the shape control agent. The shape control agent contributes to the plate-like crystal growth of alumina by firing the alumina compound in the presence of the molybdenum compound.

The use amount of the phosphorus compound is not limited to a particular amount. The molar ratio of the phosphorus element to 1 mole of the aluminum element (P/Al) in the entire raw material compound (the above mixture to be fired, for example) is preferably 0.0001 to 3.0, more preferably 0.0005 to 0.5, and, in order to cause crystal growth to suitably proceed with good productivity, even more preferably 0.001 to 0.1.

The use amount of the phosphorus compound being within the above range is preferred because the plate-like alumina particles or the card house-like alumina particles containing plate-like alumina having a high aspect ratio and excellent dispersibility are easily obtained.

The phosphorus-containing molybdenum compound described below contains phosphorus and can thus also be used as the phosphorus compound.

Aluminum Compound

The aluminum compound that can be used as the raw material is not limited to a particular compound so long as it becomes alumina by firing. Examples thereof include aluminum chloride, aluminum sulfate, basic aluminum acetate, aluminum hydroxide, boehmite, pseudo-boehmite, transition alumina (γ-alumina, δ-alumina, θ-alumina, and the like), α-alumina, and mixed alumina having two or more crystal phases. There are no particular limitations on the physical forms such as shape, particle size, and specific surface area of these aluminum compounds as precursors.

As to the shape of the aluminum compound, any of spherical, amorphous, structures with an aspect ratio (a wire, a fiber, a ribbon, a tube, and the like), a sheet, and the like can be suitably used, for example.

Similarly, as to the particle size of the aluminum compound, solids of the aluminum compound ranging from a few nanometers to a few hundred micrometers can be suitably used.

The specific surface area of the aluminum compound is also not limited to a particular value. Although a larger specific surface area is preferred because molybdenum atoms act effectively, that of any specific surface area can be used as the raw material by adjusting firing conditions and/or the use amount of molybdenum atoms.

The phosphorus-containing aluminum compound described below contains aluminum and can thus also be used as the aluminum compound.

Molybdenum-Containing Aluminum Compound

Examples of the molybdenum-containing aluminum compound that can be used as the raw material include aluminum molybdate.

Phosphorus-Containing Aluminum Compound

Examples of the phosphorus-containing aluminum compound that can be used as the raw material include aluminum phosphate ($AlPO_4$), aluminum dihydrogen phosphate ($Al(H_2PO_4)_3$), and aluminum dihydrogen triphosphate ($AlH_2(P_3O_{10})$).

(Phosphorus-Containing Molybdenum Compound)

Examples of the phosphorus-containing molybdenum compound that can be used as the raw material include phosphomolybdic acid and phosphomolybdic acid hydrate.

Metal Compound

A metal compound can have the function of promoting the crystal growth of alumina as described below. The metal compound can be used during firing as desired. The metal compound can have the function of promoting the crystal growth of α-alumina and is thus not essential to produce the alumina particles according to the present invention.

The metal compound, which is not limited to a particular compound, preferably contains at least one selected from the group consisting of Group II metal compounds and Group III metal compounds.

Examples of the Group II metal compounds include magnesium compounds, calcium compounds, strontium compounds, and barium compounds.

Examples of the Group III metal compounds include scandium compounds, yttrium compounds, lanthanum compounds, and cerium compounds.

The metal compounds described above mean oxides, hydroxides, carbonates, and chlorides of metal elements. Examples of the yttrium compounds include yttrium oxide ($Y_2O_3$), yttrium hydroxide, and yttrium carbonate. Among these, the metal compounds are preferably oxides of metal elements. Note that these metal compounds contain isomers.

Among these, the metal compounds are preferably metal compounds of third period elements, metal compounds of fourth period elements, metal compounds of fifth period elements, or metal compounds of sixth period elements, more preferably metal compounds of fourth period elements or metal compounds of fifth period elements, and even more preferably metal compounds of fifth period elements. Specifically, it is preferable to use magnesium compounds, calcium compounds, yttrium compounds, and lanthanum compounds, it is more preferable to use magnesium compounds, calcium compounds, and yttrium compounds, and it is particularly preferable to use yttrium compounds.

The addition rate of the metal compound is preferably 0.02 to 20% by mass and more preferably 0.1 to 20% by mass with respect to the mass equivalent of aluminum atoms in the entire raw material compound (the above mixture to be fired, for example). The addition rate of the metal compound being 0.02% by mass or more is preferred because the crystal growth of α-alumina containing molybdenum can suitably proceed. On the other hand, the addition rate of the metal compound being 20% by mass or less is preferred because alumina particles with a low content of impurities originating from the metal compound can be obtained.

In the firing step, a potassium compound or a sodium compound may be further used as the flux agent in combination with the molybdenum compound.

Potassium Compound

The potassium compound is not limited to a particular compound. Examples thereof include potassium chloride, potassium chlorite, potassium chlorate, potassium sulfate, potassium hydrogen sulfate, potassium sulfite, potassium hydrogen sulfite, potassium nitrate, potassium carbonate, potassium hydrogen carbonate, potassium acetate, potassium oxide, potassium bromide, potassium bromate, potassium hydroxide, potassium silicate, potassium phosphate, potassium hydrogen phosphate, potassium sulfide, potassium hydrogen sulfide, potassium molybdate, and potassium tungstate. In this case, the potassium compound contains isomers as with the case of the molybdenum compound. Among these, it is preferable to use potassium carbonate, potassium bicarbonate, potassium oxide, potassium hydroxide, potassium chloride, potassium sulfate, and potassium molybdate, and it is more preferable to use potassium carbonate, potassium bicarbonate, potassium chloride, potassium sulfate, and potassium molybdate.

The potassium compound described above may be used alone or used in combination of two or more.

Potassium molybdate among the above contains molybdenum and can thus also have the function as the molybdenum compound described above. When potassium molybdate is used as the flux agent, the same action as when the molybdenum compound and the potassium compound are used as the flux agent can be produced.

Sodium Compound

As to the sodium compound, which is not limited to a particular compound, any known ones can be used. Specific examples of these include sodium carbonate, sodium molybdate, sodium oxide, sodium sulfate, sodium hydroxide, sodium nitrate, sodium chloride, and metallic sodium. Among these, it is preferable to use sodium carbonate, sodium molybdate, sodium oxide, and sodium sulfate from the viewpoint of industrial availability and ease of handling. The sodium compound may be used alone or used in combination of two or more.

Sodium molybdate among the above contains molybdenum and can thus also have the function as the molybdenum compound described above. When sodium molybdate is used as the flux agent, the same action as when the molybdenum compound and the sodium compound are used as the flux agent can be produced.

As the potassium compound or the sodium compound used in raw material preparation or produced in the reaction of the temperature rising process in firing, water-soluble potassium compounds or sodium compounds, such as potassium molybdate, do not vaporize even in the firing temperature range and can be easily recovered by washing after firing, and thus the amount of the molybdenum compound released outside the firing furnace is also reduced, and production costs can be significantly reduced.

When the molybdenum compound and the potassium compound are used as the flux agent, the molar ratio of the molybdenum element to 1 mole of the potassium element (Mo/K) in the entire raw material compound (the mixture to be fired, for example) is preferably 5 or less, more preferably 0.01 to 3, and, because of being capable of further reducing production costs, even more preferably 0.5 to 1.5. The molar ratio (Mo/K) being within the above range is preferred because alumina particles with a large particle size can be obtained.

Similarly, when the molybdenum compound and the sodium compound are used as the flux agent, the molar ratio of the molybdenum element to 1 mole of the sodium element (Mo/Na) in the entire raw material compound (the mixture to be fired, for example) is preferably 5 or less, more preferably 0.01 to 3, and, because of being capable of further reducing production costs, even more preferably 0.5 to 1.5. The molar ratio (Mo/Na) being within the above range is preferred because alumina particles with a large particle size can be obtained.

Conditions for Producing Card House-Like Alumina Particles

Examples of conditions for efficiently producing card house-like alumina particles include, in the step of firing the aluminum compound in the presence of the molybdenum compound and the phosphorus compound, (1) using the raw material aluminum compound with a specific average particle size, (2) limiting the use amount of the raw material molybdenum compound to a specific range, and (3) limiting the use amount of the raw material phosphorus compound to a specific range.

Among the conditions (1) to (3), it is preferable that at least the condition (2) be satisfied, it is preferable that the conditions (2) and (3) be satisfied, and it is more preferable that all the conditions (1) to (3) be satisfied.

Specific examples include the following:

(1-1) using, as the raw material aluminum compound, an aluminum compound with an average particle size of preferably 3 to 300 μm and more preferably 5 to 100 μm, corresponding to the particle size of the card house-like alumina particles desired to be obtained, (2-1) making the value of the mole of the molybdenum element to 1 mole of the aluminum element (Mo/Al) in the entire raw material compound preferably 0.005 to 0.24 and more preferably 0.03 to 0.2, and (3-1) making the value of the mole of the phosphorus element to 1 mole of the aluminum element (P/Al) in the entire raw material compound preferably 0.003 to 0.09 and more preferably 0.004 to 0.02.

The average particle size and shape of the alumina particles having a card house structure can be freely adjusted by a pulverization step and a classification step described below.

Cooling Step

The method for producing the alumina particles may include a cooling step. The cooling step is a step of cooling the crystal-grown alumina particles in the firing step.

The cooling rate, which is not limited to a particular rate, is preferably 1 to 1,000° C./hour, more preferably 5 to 500° C./hour, and even more preferably 50 to 100° C./hour. The cooling rate being 1° C./hour or more is preferred because the production time can be shortened. On the other hand, the cooling rate being 1,000° C./hour or less is preferred because a firing container is less likely to break due to heat shock and can be used longer.

The method of cooling, which is not limited to a particular method, may be natural cooling or use a cooling apparatus.

Posttreatment Step

The method for producing the alumina particles of the embodiment may include a posttreatment step. The posttreatment step is a posttreatment step for the alumina particles and is a step of removing excess molybdenum. The posttreatment step may be performed after the firing step described above, be performed after the cooling step described above, or be performed after the firing step and the cooling step. The posttreatment step may be performed repeatedly two or more times as needed.

Examples of the method of posttreatment include washing and high-temperature treatment. These can be performed in combination.

The method of washing, which is not limited to a particular method, can remove excess molybdenum by washing with water, an aqueous ammonia solution, an aqueous sodium hydroxide solution, an aqueous acidic solution, or the like.

In this process, the molybdenum content in the alumina particles can be controlled by changing the concentration and the use amount of water, the aqueous ammonia solution, the aqueous sodium hydroxide solution, and the aqueous acidic solution, a washing site, a washing time, and the like as appropriate.

Examples of the method of high-temperature treatment include a method of raising the temperature up to the sublimation point or the boiling point of the molybdenum compound or more.

Pulverization Step

In the fired product obtained through the firing step, the alumina particles may agglomerate, and a suitable particle size range for applications in which they are used is not necessarily satisfied. Thus, the alumina particles may be pulverized to satisfy the suitable particle size range as needed.

The method for pulverizing the fired product is not limited to a particular method, and conventionally known methods of pulverization such as ball mills, jaw crushers, jet mills, disk mills, spectro mills, grinders, and mixer mills can be used.

Classification Step

The fired product containing the alumina particles obtained by the firing step may be subjected to classification processing as appropriate in order to adjust the particle size range. The "classification processing" refers to an operation to group particles according to size of the particles.

Classification may be either wet form or dry form, but dry classification is preferred from the viewpoint of productivity. The dry classification includes classification with a sieve and wind power classification, in which classification is performed by the difference between centrifugal force and fluid drag force. From the viewpoint of classification accuracy, wind power classification is preferred, which can be performed using classifiers such as an air flow classifier using the Coanda effect, a swirling air flow classifier, a forced vortex centrifugal classifier, and a semi-free vortex centrifugal classifier.

The pulverization step and the classification step can be performed at necessary stages. By the presence or absence of the pulverization and the classification and the selection of conditions therefor, the average particle size of the alumina particles to be obtained can be adjusted, for example.

The alumina particles of the embodiment or the alumina particles obtained by the method of production of the embodiment are preferred from the viewpoint that those with little agglomeration or no agglomeration easily exhibit their original properties, they are superior in their own handleability, and they have better dispersibility when used dispersed in a medium in which they are dispersed.

The method for producing the alumina particles of the embodiment can easily produce the alumina particles with little agglomeration or no agglomeration and thus has the excellent advantage that the alumina particles having the desired excellent properties can be produced with high productivity even without performing the pulverization step or the classification step.

EXAMPLES

The following describes the present invention in more detail with reference to examples. The present invention is not limited to the following examples.

Example 1

A mixture obtained by mixing together 15.6 g of aluminum hydroxide (FR-3801 from Hefei Zhongke Flame Retardant New Material), 0.72 g of molybdenum trioxide (manufactured by Nippon Inorganic Colour & Chemical Co., Ltd.), and 1.41 g of diphosphorus pentoxide (manufactured by Kanto Chemical Co.) with shaking for 10 minutes was put into an alumina crucible (BA-1 manufactured by Tokyo Glassware), which was covered with a lid. This crucible was fired using a fast temperature rising electric furnace (SC-2045D-SP manufactured by Motoyama), with a temperature rising rate set to 5° C./min and with a maximum temperature set to 1,100° C., at the maximum temperature for 10 hours and was then naturally cooled to room temperature to collect the obtained powder.

Subsequently, the powder obtained above was dispersed in 150 mL of 0.5% ammonia water, the dispersion solution was stirred at room temperature (25 to 30° C.) for 0.5 hour, then the ammonia water was removed by filtration, and washing with water and drying were performed to remove molybdenum remaining on the particle surfaces and to obtain a powder of Example 1.

Example 2

A mixture obtained by mixing together 10.2 g of aluminum oxide (AO9999 from Hefei Zhongke Flame Retardant New Material) and 43.2 g of molybdenum trioxide (manufactured by Nippon Inorganic Colour & Chemical Co., Ltd.) with shaking for 10 minutes was divided into five equal parts, which were put into respective alumina crucibles (BA-1 manufactured by Tokyo Glassware), which were covered with lids. These five crucibles were fired using a fast temperature rising electric furnace (SC-2045D-SP manufactured by Motoyama), with a temperature rising rate set to 5° C./min and with a maximum temperature set to 700° C., at the maximum temperature for 10 hours and were then naturally cooled to room temperature to quantitatively collect aluminum molybdate as an intermediate.

A mixture obtained by mixing together 5.5 g of this aluminum molybdate and 0.07 g of diphosphorus pentoxide (manufactured by Kanto Chemical Co.) with shaking for 10 minutes was put into an alumina crucible (BA-1 manufactured by Tokyo Glassware), which was covered with a lid. This crucible was fired using a fast temperature rising electric furnace (SC-2045D-SP manufactured by Motoyama), with a temperature rising rate set to 5° C./min and with a maximum temperature set to 1,100° C., at the maximum temperature for 10 hours and was then naturally cooled to room temperature to collect the obtained powder.

Subsequently, the powder obtained above was dispersed in 150 mL of 0.5% ammonia water, the dispersion solution was stirred at room temperature (25 to 30° C.) for 0.5 hour, then the ammonia water was removed by filtration, and washing with water and drying were performed to remove molybdenum remaining on the particle surfaces and to obtain a powder of Example 2.

Example 3

A powder of Example 3 was obtained in the same manner as in Example 1 except that a mixture obtained by mixing together 7.8 g of aluminum hydroxide (FR-3801 from Hefei Zhongke Flame Retardant New Material) and 3.9 g of phosphomolybdic acid hydrate (manufactured by Kanto Chemical Co., Inc.) with shaking for 10 minutes was used in place of the mixture of Example 1.

Example 4

A powder of Example 4 was obtained in the same manner as in Example 3 except that the use amount of phosphomolybdic acid hydrate was changed to 15.6 g and the maximum temperature for firing was set to 1,300° C.

Example 5

A powder of Example 5 was obtained in the same manner as in Example 1 except that a mixture obtained by mixing together 10.2 g of transition alumina particles (AO9999 manufactured by CHALCO, average particle size: 45 μm) as an alumina source and 1.6 g of phosphomolybdic acid hydrate with shaking for 10 minutes was used in place of the mixture of Example 1.

Example 6

A powder of Example 6 was obtained in the same manner as in Example 1 except that a mixture obtained by mixing together 10.2 g of transition alumina particles (AO9999 manufactured by CHALCO, average particle size: 45 μm) as an alumina source and 3.9 g of phosphomolybdic acid with shaking for 10 minutes was used in place of the mixture of Example 1.

Comparative Example 1

A powder of Comparative Example 1 was obtained in the same manner as in Example 1 except that a mixture obtained by mixing together 15.6 g of aluminum hydroxide (FR-3801 from Hefei Zhongke Flame Retardant New Material) and 1.56 g of molybdenum trioxide (manufactured by Nippon Inorganic Colour & Chemical Co., Ltd.) with shaking for 10 minutes was used in place of the mixture of Example 1.

Comparative Example 2

A powder of Comparative Example 2 was obtained in the same manner as in Example 1 except that a mixture obtained by mixing together 15.6 g of aluminum hydroxide (FR-3801 from Hefei Zhongke Flame Retardant New Material), 0.72 g of molybdenum trioxide (manufactured by Nippon Inorganic Colour & Chemical Co., Ltd.), and 0.16 g of silicon dioxide (manufactured by Kanto Chemical Co., Inc., guaranteed) with shaking for 10 minutes was used in place of the mixture of Example 1.

Evaluations

With the powders produced in the examples and the comparative examples used as samples, the following evaluations were conducted. The methods of measurement are shown below.

Particle Size Distribution Measurement

The particle size distribution of the sample powder was measured in dry form using a laser diffraction dry particle size analyzer (HELOS (H3355) & RODOS manufactured by Japan Laser Corporation) under the conditions of a dispersion pressure of 3 bar and a drawing pressure of 90 mbar. The particle size at a point at which a distribution curve of volume accumulation percentage intersects a horizontal axis at 10% from the smaller particle side, the particle size at a point at which it intersects the horizontal axis at 50%, and the particle size at a point at which it intersects the horizontal axis at 90% from the smaller particle side were determined as $D_{10}$, $D_{50}$, and $D_{90}$, respectively.

Size Measurement of Plate-Like Alumina Particles

The sample powder was photographed with a scanning electron microscope (SEM) (VE9800 manufactured by Keyence Corporation or JCM-7000 manufactured by JEOL Ltd.), and for the smallest unit of particles forming an aggregate (that is, primary particles) on a two-dimensional image, the average of the maximum length among distances between two points on the contour line of 50 randomly selected primary particles was defined as the average particle size of the plate-like alumina particles.

Using a scanning electron microscope (SEM), an average obtained by measuring the thickness of the 50 primary particles of the plate-like alumina particles was employed, which was defined as the thickness.

The aspect ratio was determined using the following equation.

Aspect ratio=average particle size of plate-like alu-
mina particles/thickness of plate-like alumina
particles Size Measurement of Plate-Like Alumina in Card House-
Like Alumina Particles The sample powder was photographed with a scanning
electron microscope (SEM), and the maximum length
among distances between two points on the contour line for
the plate-like alumina positioned at the center of the alumina
particle of 50 randomly selected card house-like alumina
particles on a two-dimensional image was determined. The
average thereof was defined as the average particle size of
the plate-like alumina of the card house-like alumina par-
ticles.

Using a scanning electron microscope (SEM), an average
obtained by measuring the thickness of 50 pieces of plate-
like alumina in the same manner was employed, which was
defined as the thickness.

The aspect ratio was determined using the following
equation.

Aspect ratio=average particle size of plate-like alu-
mina/thickness of plate-like alumina Crystal Structure Analysis: X-Ray Diffraction (XRD)

The sample powder was filled into a 0.5 mm-deep sample
holder for measurement, which was set in a wide-angle
X-ray diffraction (XRD) apparatus (Ultima IV by Rigaku
Corporation), and measurement was performed under the
conditions of Cu/Kα radiation, 40 kV/40 mA, a scan speed
of 2°/min, and a scanning range of 10 to 70°.

The α-Al$_2$O$_3$ content (R$_A$) and the AlPO$_4$ content (R$_B$)
were determined from spectral data obtained by performing
the XRD analysis by the reference intensity ratio (RIR)
method. They were determined from a baseline value of
2θ=15.0±0.2° (I$_0$), the RIR value of α-alumina (K$_A$), the
intensity of the peak around 2θ=35.1±0.2° attributed to the
(104) plane of α-alumina (I$_A$), the RIR value of AlPO$_4$ (K$_B$),
the intensity of the peak around 2θ=21.7±0.2° attributed to
the (111) plane of AlPO$_4$ (I$_B$), and the following equations
(1$_A$) and (1$_B$).

$$R_A \text{ (\% by weight)} = ((I_A-I_0)/K_A)/(\Sigma((I-I_0)/K)) \times 100 \quad (1_A)$$

$$R_B \text{ (\% by weight)} = ((I_B-I_0)/K_B)/(\Sigma((I-I_0)/K)) \times 100 \quad (1_B)$$

When other peaks of trace amounts of transition alumina
(β, θ, κ, and the like) are found, when using I$_X$ of each
strongest line peak and each corresponding RIR value K$_X$
(where X means each transition alumina component), the
above value of Σ((I–I$_0$)/K is a value described using each
component of I$_A$, I$_B$, and I$_X$ and each component of K$_A$, K$_B$,
and K$_X$. In the analysis in the present example, the spectra
of the respective components of I$_X$ were less than the
detection limit.

The α-crystallinity of alumina was determined from spec-
tral data obtained by performing the XRD analysis by the
reference intensity ratio (RIR) method. It was determined
from a baseline value of 2θ=15.0±0.2° (I$_0$), the RIR value of
α-alumina (K$_A$), the intensity of the peak around
2θ=35.1±0.2° attributed to the (104) plane of α-alumina
(I$_A$), and the following Equation (I$_C$).

$$\alpha\text{-crystallinity of alumina (\% by weight)} = ((I_A-I_0)/K_A)/(\Sigma((I-I_0)/K)) \times 100 \quad (1c)$$

When other peaks of trace amounts of transition alumina
(β, θ, κ, and the like) are found, when using I$_X$ of each
strongest line peak and each corresponding RIR value K$_X$
(where X means each transition alumina component), the
above value of Σ((I–I$_0$)/K is described using I$_A$, each com-
ponent of each I$_X$ and K$_A$, and each component of each K$_X$.
That is, the term added by Σ in the denominator in Equation
(1$_C$) is the term added by Σ in the denominator in Equation
(1$_A$) minus the term ((I$_B$–I$_0$)/K$_B$). In the analysis in the present example, the spectra of the respective components of
I$_X$ were less than the detection limit.

For each RIR value, a value described in the ICSD
(Inorganic Crystal Structure Database) was used, and for the
analysis, Integrated Powder X-ray Analysis Software
(PDXL) (manufactured by Rigaku Corporation) was used.

X-Ray Fluorescence (XRF) Analysis

Using an X-ray fluorescence analyzer Primus IV (manu-
factured by Rigaku Corporation), about 70 mg of the sample
powder was placed on filter paper, was covered with PP film,
and was subjected to X-ray fluorescence (XRF) analysis
under the following conditions.

Measurement Conditions

EZ scan mode

Measured elements: F to U

Measurement time: standard

Measurement diameter: 10 mm

Residual (balance component): none

The aluminum content and the molybdenum content of
the alumina particles obtained by the XRF analysis were
determined in terms of oxide to acquire the results of the
Al$_2$O$_3$ content (A$_1$) with respect to 100% by mass of the
alumina particles, the MoO$_3$ content (M$_1$) with respect to
100% by mass of the alumina particles, and the P$_2$O$_5$ content
(P$_1$) with respect to 100% by mass of the alumina particles.

XPS Surface Analysis

For surface elemental analysis of the sample powder, the
measurement of X-ray photoelectron spectroscopy (XPS)
was performed using a QUANTERA SXM manufactured by
ULVAC Phi, Inc. The average of n=3 measurement was
acquired for each element in atom % by 1,000 μm square
area measurement.

X-ray source: monochromatized Al-Kα, beam diameter
100 μmφ, output 25 W

Measurement: area measurement (1,000 μm square), n=3

Charging correction: C1s=284.8 eV

The aluminum content of the surface layers of the alumina
particles and the molybdenum content of the surface layers
obtained by the XPS analysis were determined in terms of
oxide to determine an Al$_2$O$_3$ content (A$_2$) (% by mass) with
respect to 100% by mass of the surface layers of the alumina
particles, a MoO$_3$ content (M$_2$) (% by mass) with respect to
100% by mass of the surface layers of the alumina particles,
a P$_2$O$_5$ content (P$_2$) with respect to 100% by mass of the
surface layers of the alumina particles, and a [P]/[Al] molar
ratio.

Isoelectric Point Measurement of Alumina Particles

Zeta potential measurement for the alumina particles was
performed with a zeta potential measurement apparatus
(Malvern, Zetasizer Nano ZSP). A sample in an amount of
20 mg and 10 mL of a 10 mM aqueous KCl solution were
stirred with Awatori Rentaro (Thinky, ARE-310) in the
stirring and defoaming mode for 3 minutes, and the super-
natant obtained after being left at rest for 5 minutes was used
as a sample for measurement. Using an autotitrator, 0.1 N
HCl was added to the sample, and zeta potential measure-
ment was performed in a range up to pH=2 (applied voltage:
100 V, Monomodl mode) to obtain an isoelectric point that
is a pH with zeta potential of 0.

Specific Surface Area Measurement of Alumina Particles

The specific surface area of the alumina particles was
measured with a specific surface area meter (manufactured
by Microtrac Bell Corporation, BELSORP-mini), and the
surface area per gram of a sample measured from the
adsorption amount of nitrogen gas by the BET method was
calculated as the specific surface area (m$^2$/g).

Results

Table 1 lists the values obtained from the above evalua-
tions. Note that "N.D." is an abbreviation for "not detected"
and indicates that the absence of detection.

TABLE 1

| | | | | Example 1 | Example 2 | Example 3 | Example 4 | Example 5 |
|---|---|---|---|---|---|---|---|---|
| Production | Raw material blending amount | MoO$_3$ | g | 0.72 | — | — | — | — |
| | | Al$_2$(MoO$_4$)$_3$ | g | — | 5.5 | — | — | — |
| | | H$_3$PMo$_{12}$O$_{40}$•nH$_2$O | g | — | — | 3.9 | 15.6 | 1.6 |
| | | P$_2$O$_5$ | g | 1.41 | 0.07 | — | — | — |
| | | Al(OH)$_3$ | g | 15.6 | — | 7.8 | 7.8 | — |
| | | Transition Al$_2$O$_3$ | g | — | — | — | — | 10.2 |
| | | SiO$_2$ | g | — | — | — | — | — |
| | Raw material Mo/Al molar ratio | | | 0.025 | 1.50 | 0.26 | 1.03 | 0.05 |
| | Raw material P/Al molar ratio | | | 0.025 | 0.0017 | 0.021 | 0.085 | 0.004 |
| | Firing temperature | | °C | 1,100 | 1,100 | 1,100 | 1,300 | 1,100 |
| Analysis | Shape | | | Plate-like | Plate-like | Plate-like | Plate-like | Card house |
| | D$_{50}$ | | μm | — | 19.18 | 10.59 | — | 8.27 |
| | Average particle size *1 | | μm | 12 | 35 | 13 | 35 | 7.7 |
| | Thickness *2 | | μm | 2 | 2 | 2 | 1.4 | 0.3 |
| | Aspect ratio (average particle size/thickness) | | | 6 | 17.5 | 6.5 | 25 | 26 |
| | XRD | α-Al$_2$O$_3$ (R$_A$) | % by weight | 90.2 | 87.3 | 96.8 | 85.5 | 99.4 |
| | | AlPO$_4$ (R$_B$) | % by weight | 9.8 | 12.7 | 3.2 | 14.5 | 0.6 |
| | XRF | Al$_2$O$_3$ (A$_1$) | % by mass | 92.0 | 80.3 | 96.3 | 89.4 | 96.7 |
| | | MoO$_3$ (M$_1$) | % by mass | 2.2 | 13.1 | 2.05 | 0.8 | 0.2 |
| | | P$_2$O$_5$ (P$_1$) | % by mass | 5.6 | 5.4 | 1.41 | 9.2 | 3.0 |
| | XPS | Al$_2$O$_3$ (A$_2$) | % by mass | 84.2 | 80.9 | 75.8 | 57.4 | 79.8 |
| | | MoO$_3$ (M$_2$) | % by mass | 2.4 | 4.8 | 3.8 | 0.4 | 3.1 |
| | | P$_2$O$_5$ (P$_2$) | % by mass | 10.7 | 9.5 | 17.9 | 35.2 | 11.3 |
| | | [P]/[Al] molar ratio | | 0.12 | 0.11 | 0.097 | 0.61 | 0.058 |
| | Surface layer unevenly distributed ratio (M$_2$/M$_1$) | | | 1.10 | 0.36 | 1.85 | 0.50 | 15.50 |
| | Surface layer unevenly distributed ratio (P$_2$/P$_1$) | | | 1.91 | 1.76 | 12.69 | 3.83 | 3.76 |
| | pH of isoelectric point | | | <2.0 | <2.0 | <2.0 | <2.0 | <2.0 |
| | BET specific surface area | | m$^2$/g | 0.38 | 0.58 | 0.38 | 0.60 | 0.58 |

| | | | | Example 6 | Comparative Example 1 | Comparative Example 2 |
|---|---|---|---|---|---|---|
| Production | Raw material blending amount | MoO$_3$ | g | — | 1.56 | 1.56 |
| | | Al$_2$(MoO$_4$)$_3$ | g | — | — | — |
| | | H$_3$PMo$_{12}$O$_{40}$•nH$_2$O | g | 3.9 | — | — |
| | | P$_2$O$_5$ | g | — | — | — |
| | | Al(OH)$_3$ | g | — | 15.6 | 15.6 |
| | | Transition Al$_2$O$_3$ | g | 10.2 | — | — |
| | | SiO$_2$ | g | — | — | 0.16 |
| | Raw material Mo/Al molar ratio | | | 0.13 | 0.054 | 0.054 |
| | Raw material P/Al molar ratio | | | 0.011 | 0 | 0 |
| | Firing temperature | | °C | 1,100 | 1,100 | 1,100 |
| Analysis | Shape | | | Card house | Polyhedron | Plate-like |
| | D$_{50}$ | | μm | 12.10 | 4.9 | 6.5 |
| | Average particle size *1 | | μm | 17 | 5 | 10 |
| | Thickness *2 | | μm | 0.6 | — | 0.5 |
| | Aspect ratio (average particle size/thickness) | | | 28.3 | — | 20 |
| | XRD | α-Al$_2$O$_3$ (R$_A$) | % by weight | 98.0 | >99 | >99 |
| | | AlPO$_4$ (R$_B$) | % by weight | 2.0 | N.D. | N.D. |
| | XRF | Al$_2$O$_3$ (A$_1$) | % by mass | 96.1 | 98.4 | 98.0 |
| | | MoO$_3$ (M$_1$) | % by mass | 0.4 | 1.5 | 0.6 |
| | | P$_2$O$_5$ (P$_1$) | % by mass | 3.4 | N.D. | N.D. |
| | XPS | Al$_2$O$_3$ (A$_2$) | % by mass | 85.6 | 98.0 | 89.9 |
| | | MoO$_3$ (M$_2$) | % by mass | 1.5 | 1.7 | 0.3 |
| | | P$_2$O$_5$ (P$_2$) | % by mass | 9.6 | N.D. | N.D. |
| | | [P]/[Al] molar ratio | | 0.046 | — | — |
| | Surface layer unevenly distributed ratio (M$_2$/M$_1$) | | | 3.75 | 1.13 | 0.50 |
| | Surface layer unevenly distributed ratio (P$_2$/P$_1$) | | | 2.82 | — | — |
| | pH of isoelectric point | | | <2.0 | 3.5 | 3.5 |
| | BET specific surface area | | m$^2$/g | 0.60 | 0.60 | 0.67 |

*1: for the card house shape, the particle size of plate-like alumina contained therein
*2: for the card house shape, the thickness of plate-like alumina contained therein FIG. 1 to FIG. 8 illustrate SEM images of the powders of the examples and the comparative example obtained by photographing them with a scanning electron microscope (SEM). Plate-like or card house-like particles were identified in each of the examples and the comparative examples. The powders obtained in the examples were determined to be particles with few aggregates and excellent handleability.

Figures 9, 10:
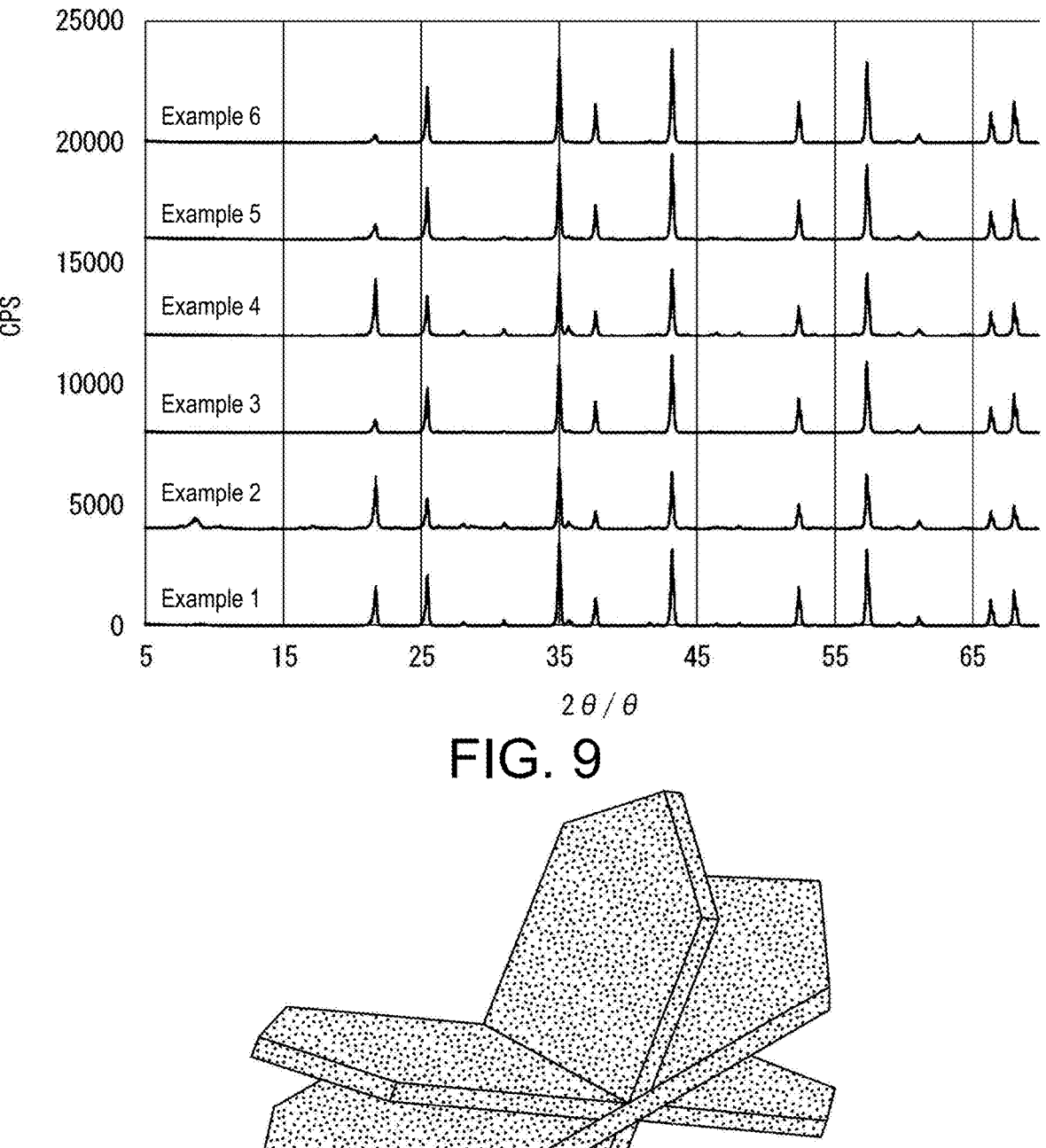
FIG. 9 is X-ray diffraction (XRD) patterns of the alumina particles of the examples.
FIG. 10 is a schematic diagram of an example of a configuration of alumina particles having a card house structure.

FIG. 9 illustrates the results of the XRD analysis. Each peak derived from α-alumina (α-Al$_2$O$_3$) was identified in the sample of each of the examples. Each peak derived from AlPO$_4$ was identified in the sample of each of the examples.

While sharp peak scattering derived from α-alumina was identified, alumina crystal system peaks other than those of the α-crystal structure were not identified. Based on a strongest peak height ratio between α-alumina and transition alumina, it was determined that all the alumina particles of the examples had an α-crystallinity of 99% by weight or more and had a dense crystalline structure.

Table 1 lists the results of the α-$Al_2O_3$ content ($R_A$) and the $AlPO_4$ content ($R_B$) with respect to 100% by weight of the alumina particles, determined by the XRD analysis. In the alumina particles analyzed in the present example, no peaks corresponding to the molybdenum compound were detected in the XRD analysis (they were less than the detection limit). It is considered that the molybdenum contained in the alumina particles probably did not grow as crystals but adhered as amorphous to the surfaces of the alumina particles and the like, resulting in no detection of peaks in the XRD analysis.

The results of the SEM observation and the XRD analysis determined that the powders obtained in the examples and the comparative examples were alumina particles containing alumina.

The alumina particles obtained in the examples and the comparative examples had the $D_{50}$, the average particle size, the thickness, the aspect ratio, and the BET specific surface area listed in Table 1.

The results of the respective examples showed that the plate-like or card house-like alumina particles were able to be produced by firing the aluminum compound in the presence of the molybdenum compound and the phosphorus compound.

It was also shown that alumina particles with their shape controlled and with a high α-crystallinity were able to be fired even at a relatively low firing temperature of 1,100° C.

The plate-like alumina particles and the plate-like alumina forming the card house-like alumina particles had the high aspect ratios listed in Table 1. This indicates that phosphorus can exhibit an excellent function as a shape control agent taking part in plate-like crystal growth in the flux method using the molybdenum compound as the flux agent.

Table 1 lists the values of the $Al_2O_3$ content ($A_1$), the $MoO_3$ content ($M_1$), the $P_2O_5$ content ($P_1$), the $Al_2O_3$ content ($A_2$), the $MoO_3$ content ($M_2$), and the $P_2O_5$ content ($P_2$).

From the results of the $MoO_3$ content ($M_1$) and the $MoO_3$ content ($M_2$), the alumina particles of Examples 1 to 6 contain molybdenum in the surface layers, and it can be expected that various actions by molybdenum, such as catalytic activity, are exhibited.

From the results of the $P_2O_5$ content ($P_1$) and the $P_2O_5$ content ($P_2$), the alumina particles of Examples 1 to 6 contain phosphorus in the surface layers and can make the surface properties of the alumina particles more acidic, and it can be expected that various actions by phosphorus are exhibited, such as the ability to improve an affinity for basic organic compounds and various binders and matrices, for example.

It was also determined that the alumina particles obtained in the examples and the comparative examples had the values of the pH of the isoelectric point listed in Table 1. It is inferred that molybdenum and phosphorus are contained in the surface layers of the alumina particles, thereby shifting the pH value of the isoelectric point toward the acidic side, and making dispersibility excellent.

Each configuration and a combination thereof and the like in each embodiment are by way of example, and additions, omissions, substitutions, and other changes of the configuration can be made without departing from the gist of the present invention. The present invention is not limited by each embodiment but is limited only by the scope of the claims.

What is claimed is:

1. Alumina particles comprising phosphorus and molybdenum, wherein the phosphorus is unevenly distributed in surface layers of the alumina particles.

2. The alumina particles according to claim 1, wherein the alumina particles have an alpha crystallinity of 90% by weight or more.

3. The alumina particles according to claim 1, wherein the alumina particles are plate-like.

4. The alumina particles according to claim 3, wherein the alumina particles have a $D_{50}$ of 2 to 100 μm.

5. The alumina particles according to claim 3, wherein an average particle size of primary particles of the alumina particles is 5 to 200 μm and an aspect ratio obtained by dividing the average particle size of the primary particles of the alumina particles by a thickness of the primary particles of the alumina particles is 2 to 100.

6. The alumina particles according to claim 1, wherein the alumina particles are card house-like.

7. The alumina particles according to claim 6, wherein the alumina particles have a $D_{50}$ of 3 to 300 μm.

8. The alumina particles according to claim 6, wherein the alumina particles contain plate-like alumina with an average particle size of 5 to 200 μm, and an aspect ratio obtained by dividing an average particle size by a thickness of each plate-like alumina is 2 to 100.

9. The alumina particles according to claim 1, wherein the alumina particles have an isoelectric point of 0~3 that is a pH with zeta potential of 0.

10. The alumina particles according to claim 1, wherein the alumina particles have a specific surface area measured by the BET method of 0.1 to 10 $m^2/g$.

11. The alumina particles according to claim 1, wherein the molybdenum is unevenly distributed in surface layers of the alumina particles.

12. The alumina particles according to claim 1, wherein the alumina particles have a molar ratio [P]/[Al] between a phosphorus concentration and an aluminum concentration by X-ray photoelectron spectroscopy (XPS) measurement of 0.001 or more.

13. A resin composition comprising the alumina particles according to claim 1 and a resin.

14. A molded body made by molding the resin composition according to claim 13.

15. A method for producing the alumina particles according to claim 1, the method comprising firing an aluminum compound in presence of a molybdenum compound and a phosphorus compound.

16. The method for producing the alumina particles according to claim 15, comprising firing a mixture of the molybdenum compound, the phosphorus compound, and the aluminum compound.

17. The method for producing the alumina particles according to claim 15, comprising firing a mixture of a molybdenum-containing aluminum compound and the phosphorus compound.

18. The method for producing the alumina particles according to claim 15, comprising firing a mixture of a phosphorus-containing aluminum compound and the molybdenum compound.

19. The method for producing the alumina particles according to claim 15, comprising firing a mixture of a phosphorus-containing molybdenum compound and the aluminum compound.

20. The method for producing the alumina particles according to claim 15, wherein a firing temperature is 900 to 1,600° C.

\* \* \* \* \*